United States Patent
Onggosanusi et al.

(10) Patent No.: US 10,164,747 B2
(45) Date of Patent: Dec. 25, 2018

(54) METHOD AND APPARATUS FOR OPERATING MIMO MEASUREMENT REFERENCE SIGNALS AND FEEDBACK

(71) Applicant: Samsung Electronics Co., Ltd, Suwon-si (KR)

(72) Inventors: Eko Onggosanusi, Mountain View, CA (US); Hoondong Noh, Mountain View, CA (US); Md Saifur Rahman, Mountain View, CA (US); Jianzhong Zhang, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

(21) Appl. No.: 15/163,501

(22) Filed: May 24, 2016

(65) Prior Publication Data

US 2016/0359538 A1 Dec. 8, 2016

Related U.S. Application Data

(60) Provisional application No. 62/168,521, filed on May 29, 2015, provisional application No. 62/169,246, (Continued)

(51) Int. Cl.
*H04L 5/00* (2006.01)
*H04B 7/0456* (2017.01)
*H04B 7/06* (2006.01)

(52) U.S. Cl.
CPC ......... *H04L 5/0048* (2013.01); *H04B 7/0469* (2013.01); *H04B 7/0478* (2013.01); (Continued)

(58) Field of Classification Search
CPC ... H04L 5/0048; H04L 5/0035; H04L 5/0023; H04L 5/0057; H04L 5/0073; H04L 5/0053; H04L 5/001; H04L 1/0026
See application file for complete search history.

(56) References Cited

U.S. PATENT DOCUMENTS 8,537,911 B2 * 9/2013 Sayana ................ H04L 5/0094
341/173
2011/0194551 A1 * 8/2011 Lee ...................... H04B 7/0626
370/342

(Continued)

FOREIGN PATENT DOCUMENTS

WO  2014208974 A1  12/2014

OTHER PUBLICATIONS

International Search Report dated Sep. 9, 2016 in connection with International Application No. PCT/KR2016/005655, 3 pages.

(Continued)

*Primary Examiner* — Sai Aung

(57) ABSTRACT

Methods and apparatuses for CSI reporting mechanisms are provided. A user equipment (UE) includes a transceiver configured to receive channel state information (CSI) process configuration information with a plurality of non-zero-power (NZP) CSI reference signal (CSI-RS) resource configurations. The UE includes a processor operably connected to the transceiver, the processor configured to calculate, in response to receipt of the configuration information, a CSI report associated with a CSI-RS type or a multiple-input multiple-output (MIMO) type. The transceiver is further configured to transmit the CSI report on an uplink channel. At least one of the NZP CSI-RS resource configurations corresponds to a beamformed type.

20 Claims, 16 Drawing Sheets

Related U.S. Application Data filed on Jun. 1, 2015, provisional application No. 62/184,288, filed on Jun. 25, 2015, provisional application No. 62/203,689, filed on Aug. 11, 2015, provisional application No. 62/205,460, filed on Aug. 14, 2015, provisional application No. 62/213,924, filed on Sep. 3, 2015, provisional application No. 62/185,344, filed on Jun. 26, 2015, provisional application No. 62/174,307, filed on Jun. 11, 2015, provisional application No. 62/194,330, filed on Jul. 20, 2015, provisional application No. 62/332,268, filed on May 5, 2016.

(52) U.S. Cl.
CPC ............ *H04L 5/0057* (2013.01); *H04B 7/063* (2013.01); *H04B 7/0632* (2013.01); *H04B 7/0639* (2013.01)

(56) References Cited

U.S. PATENT DOCUMENTS

| | | | |
|---|---|---|---|
| 2013/0258965 | A1 | 10/2013 | Geirhofer et al. |
| 2014/0086092 | A1* | 3/2014 | Chen ..................... H04L 1/0028 370/252 |
| 2014/0269395 | A1 | 9/2014 | Chen et al. |
| 2014/0301271 | A1* | 10/2014 | Xu ........................ H04W 24/02 370/328 |
| 2014/0369242 | A1 | 12/2014 | Ng et al. |
| 2015/0049626 | A1 | 2/2015 | Chen et al. |
| 2016/0149680 | A1 | 5/2016 | Kang et al. |
| 2016/0344525 | A1* | 11/2016 | Kang ................... H04B 7/0469 |

OTHER PUBLICATIONS

3GPP TS 36.211 V12.4.0 (Dec. 2014) 3rd Generation Partnership Project; Technical Specification Group Radio Access Network; E-UTRA; Physical channels and modulation; (Release 12); 124 pgs.
3GPP TS 36.212 V12.3.0 (Dec. 2014) 3rd Generation Partnership Project; Technical Specification Group Radio Access Network; E-UTRA; Multiplexing and channel coding (Release 12), 89 pgs.
3GPP TS 36.213 V12.4.0 (Dec. 2014) 3rd Generation Partnership Project; Technical Specification Group Radio Access Network; E-UTRA, Physical layer procedures (Release 12), 225 pgs.
3GPP TS 36.331 V12.4.0 (Dec. 2014) 3rd Generation Partnership Project; Technical Specification Group Radio Access Network; E-UTRA; Radio Resource Control (RRC); Protocol specification (Release 12), 410 pgs.
3GPP TS 36.321 v12.4.0, (Dec. 2014)3rd Generation Partnership Project;Technical Specification Group Radio Access Network; E-UTRA, Medium Access Control (MAC) protocol specification; (Release 12), 60 pgs.
Extended European Search Report regarding Application No. 168036903, dated May 4, 2018, 14 pages.
Samsung, "CSI Reporting Types for Rel. 13 FD-MIMO", 3GPP TSG RAN WG1 Meeting #81, R1-153387, May 2015, 5 pages.
Intel Corporation, "Discussion on CSI enhancements using beamformed CSI-RS for FD-MIMO systems", 3GPP TSG RAN WG1 Meeting #81, R1-152631, May 2015, 5 pages.
Qualcomm Incorporated, "Discussion on beamformed CSI-RS and feedback enhancements", 3GPP TSG RAN WG1 Meeting #81, R1-153455, May 2015, 6 pages.

\* cited by examiner

METHOD AND APPARATUS FOR OPERATING MIMO MEASUREMENT REFERENCE SIGNALS AND FEEDBACK

CROSS-REFERENCE TO RELATED APPLICATIONS AND CLAIM OF PRIORITY

This application claims priority under 35 U.S.C. § 119(e) to:

U.S. Provisional Patent Application Ser. No. 62/168,521 filed May 29, 2015;
U.S. Provisional Patent Application Ser. No. 62/169,246 filed Jun. 1, 2015;
U.S. Provisional Patent Application Ser. No. 62/174,307 filed Jun. 11, 2015;
U.S. Provisional Patent Application Ser. No. 62/184,288 filed Jun. 25, 2015;
U.S. Provisional Patent Application Ser. No. 62/185,344 filed Jun. 26, 2015;
U.S. Provisional Patent Application Ser. No. 62/194,330 filed Jul. 20, 2015;
U.S. Provisional Patent Application Ser. No. 62/203,689 filed Aug. 11, 2015;
U.S. Provisional Patent Application Ser. No. 62/205,460 filed Aug. 14, 2015;
U.S. Provisional Patent Application Ser. No. 62/213,924 filed Sep. 3, 2015; and
U.S. Provisional Patent Application Ser. No. 62/332,268 filed May 5, 2016

The above-identified provisional patent applications are hereby incorporated by reference in their entirety.

TECHNICAL FIELD

The present disclosure relates generally to transmission mode and channel state information (CSI) reporting for multiple transmit antennas which includes two dimensional arrays. Such two dimensional arrays can be associated with a type of multiple-input multiple-output (MIMO) system often termed "full-dimension" MIMO (FD-MIMO) or massive MIMO or 3D-MIMO.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two dimensional array transmit antennas or, in general, antenna array geometry which accommodates a large number of antenna elements.

SUMMARY

Various embodiments of the present disclosure provide methods and apparatuses for codebook design and signaling.

In one embodiment, a user equipment (UE) is provided. The UE includes a transceiver configured to receive channel state information (CSI) process configuration information with a plurality of non-zero-power (NZP) CSI reference signal (CSI-RS) resource configurations. The UE includes a processor operably connected to the transceiver, the processor configured to calculate, in response to receipt of the configuration information, a CSI report associated with a CSI-RS type or a MIMO type. The transceiver is further configured to transmit the CSI report on an uplink channel. At least one of the NZP CSI-RS resource configurations corresponds to a beamformed type.

In another embodiment, a base station (BS) is provided. The BS includes a processor configured to generate configuration information to configure a UE with a CSI process and configure the UE with a plurality of NZP CSI-RS resource configurations. The BS includes a transceiver operably connected to the processor, the transceiver configured to transmit the configuration information for the CSI process and the NZP CSI-RS resources; and receive a CSI report associated with a CSI-RS type or a MIMO type in accordance with the configuration information. At least one of the NZP CSI-RS resource configurations corresponds to a beamformed type.

In another embodiment, a method for operating a UE is provided. The method includes receiving, by the UE, CSI process configuration information with a plurality of NZP CSI-RS resource configurations. The method includes, in response to receipt of the configuration information, calculating, by the UE, a CSI report associated with a CSI-RS type or a MIMO type. Additionally, the method includes transmitting, by the UE, the CSI report on an uplink channel. At least one of the NZP CSI-RS resource configurations corresponds to a beamformed type.

Other technical features may be readily apparent to one skilled in the art from the following figures, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

LIST OF ACRONYMS

2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNodeB"
DL: downlink
UL: uplink
CRS: cell-specific reference signal(s)
DMRS: demodulation reference signal(s)
SRS: sounding reference signal(s)
UE-RS: UE-specific reference signal(s)

CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); and 3GPP TS 36.331 version 12.4.0, "E-UTRA, Radio Resource Control (RRC) Protocol Specification" ("REF 4").

Figure 1:
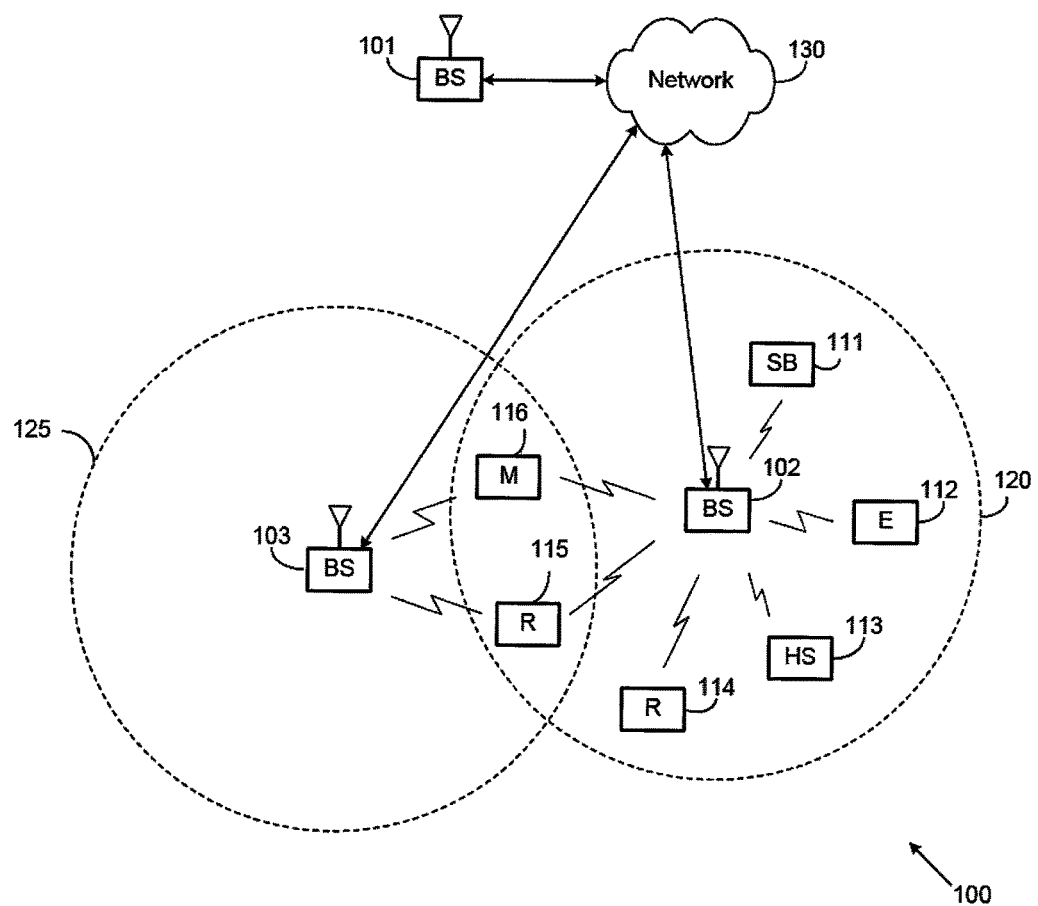
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of the present disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network. Depending on the network type, other well-known terms can be used instead of "eNB" or "eNB," such as "base station" or "access point." For the sake of convenience, the terms "eNB" and "eNB" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, can have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support channel quality measurement and reporting for systems having 2D antenna arrays. In various embodiments, one or more of BSs 101-103 and UEs 111-116 perform signaling, configuration and/or calculation for CSI reporting.

Although FIG. 1 illustrates one example of a wireless network 100, various changes can be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
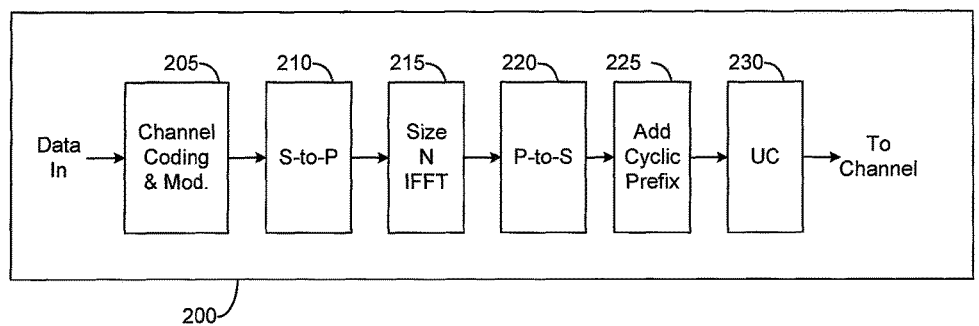
FIGS. 2A and 2B illustrate example wireless transmit and receive paths according to various embodiments of the present disclosure.
Figure 2B:
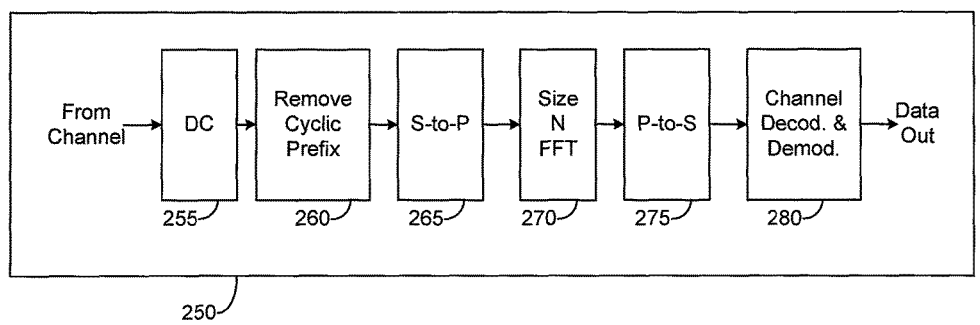

FIGS. 2A and 2B illustrate example wireless transmit and receive paths according to the present disclosure. In the following description, a transmit path 200 can be described as being implemented in an eNB (such as eNB 102), while a receive path 250 can be described as being implemented in a UE (such as UE 116). However, it will be understood that the receive path 250 could be implemented in an eNB and that the transmit path 200 could be implemented in a UE. In some embodiments, the receive path 250 is configured to support channel quality measurement and reporting for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The up-converter 230 modulates (such as up-converts) the output of the 'add cyclic prefix' block 225 to an RF frequency for transmission via a wireless channel. The signal can also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for a designed codebook. Each of the eNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to eNBs 101-103 and can implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Other suitable architectures could be used to support wireless communications in a wireless network.

Figure 3A:
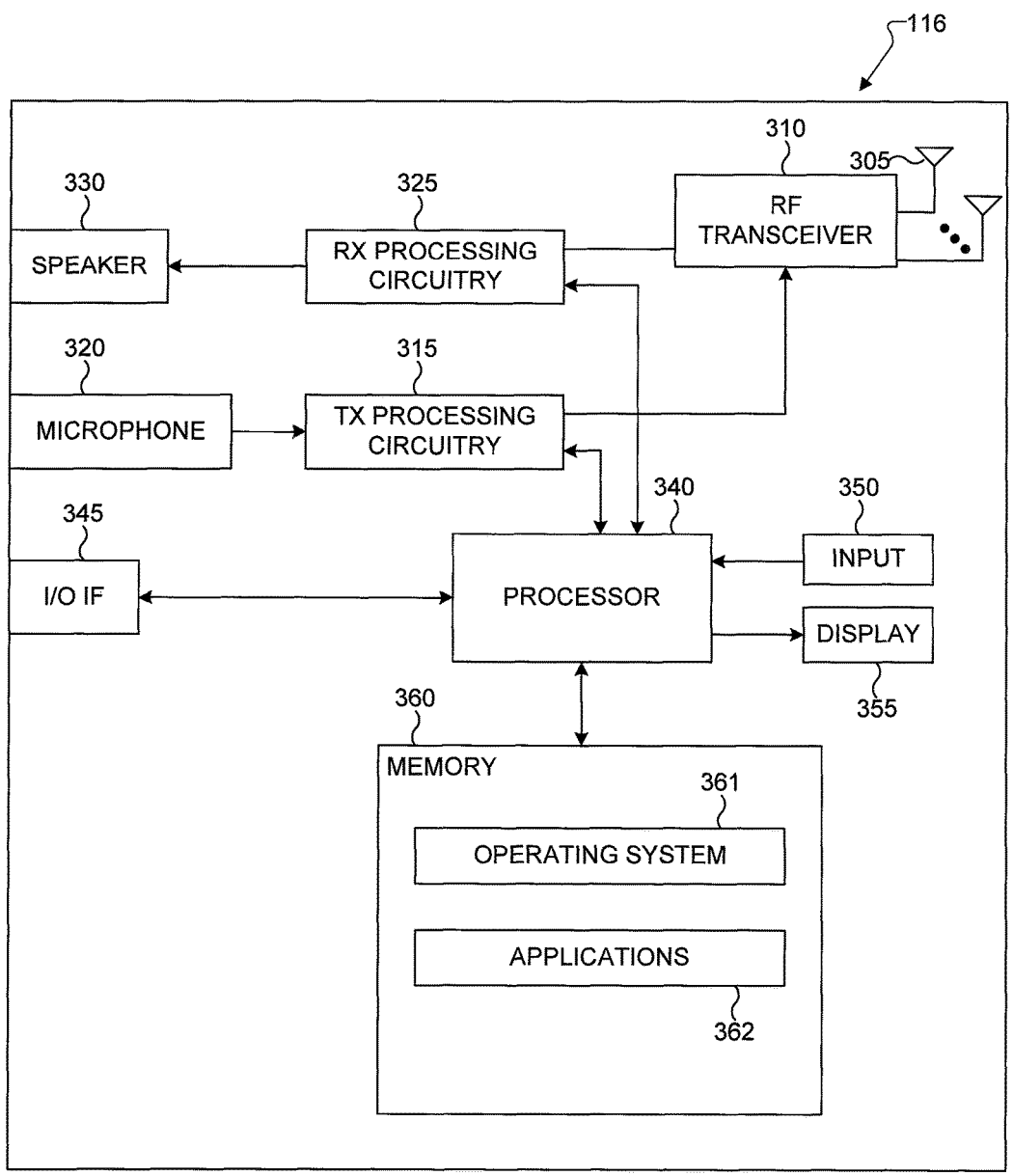
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface (IF) 345, an input 350, a display 355, and a memory 360. The memory 360 includes an operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for channel quality measurement and reporting for systems having 2D antenna arrays as described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from eNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the UE 116 can perform signaling and calculation for CSI reporting. Although FIG. 3A illustrates one example of UE 116, various changes can be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
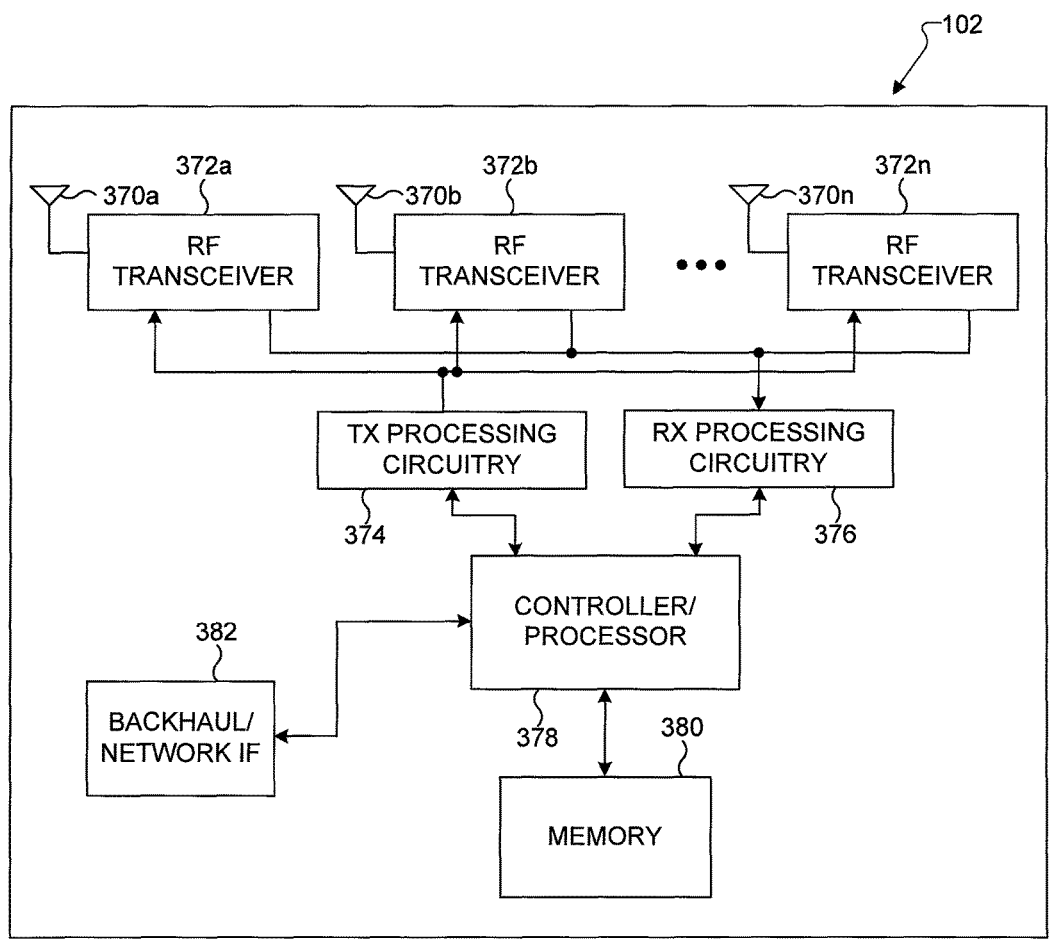
FIG. 3B illustrates an example enhanced NodeB (eNB) according to various embodiments of the present disclosure.

FIG. 3B illustrates an example eNB 102 according to the present disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of the present disclosure to any particular implementation of an eNB. eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. In some embodiments, the controller/processor 378 includes at least one microprocessor or microcontroller.

The controller/processor 378 is also capable of executing programs and other processes resident in the memory 380, such as an OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G or new radio access technology or NR, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) perform configuration and signaling for CSI reporting.

Although FIG. 3B illustrates one example of an eNB 102, various changes can be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Figure 4:
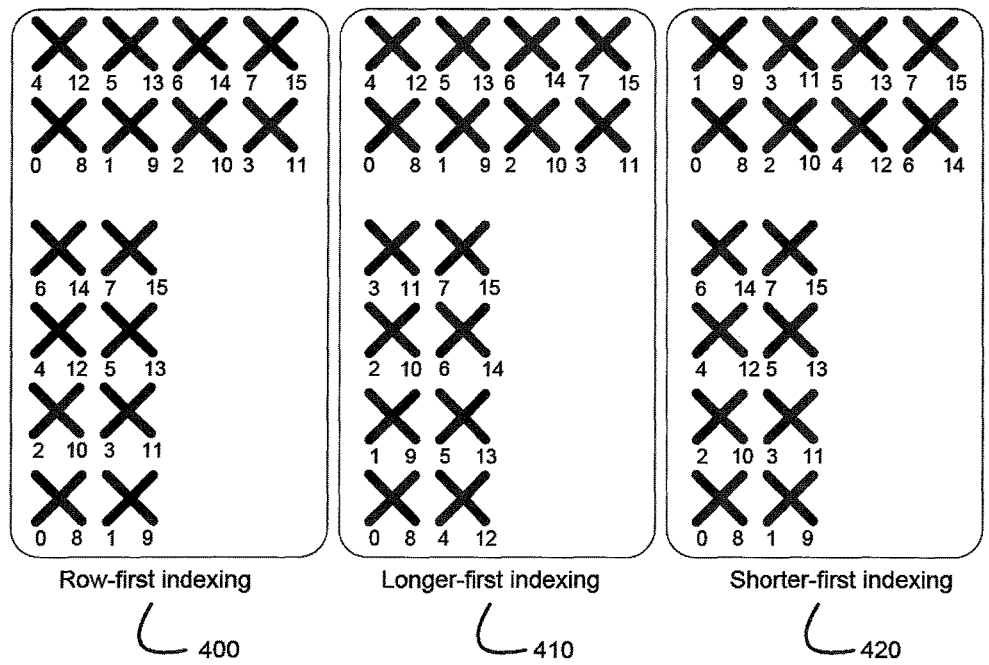
FIG. 4 illustrates example two-dimensional (2D) antenna arrays constructed from 16 dual-polarized elements arranged in a 4×2 or 2×4 rectangular format which can be utilized in various embodiments of the present disclosure.

FIG. 4 depicts an example of a 2D dual-polarized antenna port array with $M_a$ rows and $N_a$ columns where $(M_a, N_a)=(2,4)$ and $(4,2)$ which can be utilized in one or more embodiments of the present disclosure. The embodiment of the 2D dual-polarized antenna port array shown in FIG. 4 is for illustration only. Other embodiments of the 2D dual-polarized antenna port array could be used without departing from the scope of the present disclosure.

The example 2D dual-polarized antenna port array arrangement results in a total of $2M_aN_a=16$ ports, each mapped to one CSI-RS port. The three indexings 400, 410, and 420 are three examples in indexing the 16 antenna ports as a means of mapping antenna ports to precoding matrix elements. For row-first indexing 400, antenna ports associated with the same polarization group are indexed in a row-first manner regardless of ($M_a$, $N_a$). For longer-first indexing 410, antenna ports associated with the same polarization group are indexed in a column-first manner when $M_a > N_a$, but row-first manner when $M_a \leq N_a$. For shorter-first indexing 420, antenna ports associated with the same polarization group are indexed in a row-first manner when $M_a > N_a$, but column-first manner when $M_a \leq N_a$. Indexing 400 is therefore termed row-first indexing while indexing 410 longer-first indexing and indexing 420 shorter-first indexing.

In these illustrative embodiments, both $M_a$ and $N_a$ can be configured by an eNB for a UE. In another example, rather than defining $M_a$ and $N_a$ as the number of rows and columns of the rectangular array of ports or port pattern, respectively, these two parameters can be defined as two-dimensional precoding codebook parameters. The values of $M_a$ and $N_a$ partly determine the manner in which a codebook (hence each precoding matrix element in the codebook) is mapped onto antenna ports of a one- or two-dimensional antenna array. This configuration can be performed with and without signaling the total number of antenna ports. When a UE is configured with a codebook, these parameters can be included either in a corresponding CSI process configuration or NZP (non-zero-power) CSI-RS resource configuration.

In legacy LTE systems, precoding codebooks are utilized for CSI reporting. Two categories of CSI reporting modes are supported: PUSCH-based aperiodic CSI (A-CSI) and PUCCH-based periodic CSI (P-CSI). In each category, different modes are defined based on frequency selectivity of CQI and/or PMI, that is, whether wideband (one CSI parameter calculated for all the "set S subbands") or subband (one CSI parameter calculated for each "set S subband") reporting is performed. The supported CSI reporting modes are given in TABLE 1 and 2.

TABLE 1

CQI and PMI Feedback Types for PUSCH (Aperiodic) CSI Reporting Modes

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

TABLE 2

CQI and PMI Feedback Types for PUCCH (Periodic) CSI Reporting Modes

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

A precoding matrix or a precoder, which can be used by an eNB (such as 102) to perform short-term precoding for transmitting to a UE and assumed by a UE to derive a CSI report, can be described as a dual-stage precoding matrix:

$$W = W_1 W_2 \quad \text{(Equation 1)}$$

Referring to FIG. 4, the size of the precoding matrix W is $N_{TX} \times N_L$ where $N_{TX} = 2 M_a N_a$ is the total number of antenna or CSI-RS ports and $N_L$ is the number of transmission layers (also termed the rank). The first-stage precoder $W_1$ pertains to a long-term component and is associated with long-term channel statistics. In addition, $W_1$ is wideband (the same $W_1$ for all the set S subbands). The second-stage precoder $W_2$ pertains to a short-term component which performs selection, co-phasing, or any linear operation to $W_1$. Therefore, the number of columns of $W_1$ can be perceived as the number of basis vectors $N_b$ for $W_2$. In addition, $W_2$ can be either wideband (the same $W_2$ for all the set S subbands) or subband (one $W_2$ for each set S subband).

For 2D (two-dimensional) rectangular port array, each of the first and the second stage precoders can be described as a Kronecker product of a first and a second precoder. In the present disclosure, $A \otimes B$ denotes the Kronecker product between two matrices A and B. This example embodiment is termed the full Kronecker Product (full KP) codebook. The subscripts m and n in $W_{m,n}(i_{m,n})$ denote precoding stage (first or second) and dimension (first or second, such as vertical or horizontal), respectively. Each of the precoders $W_{m,n}$ is a function of an index which serves as a PMI component. Thus, the precoding matrix W can be described in terms of 4 PMI components $i_{1,1}$, $i_{1,2}$, $i_{2,1}$, $i_{2,2}$ as follows.

$$\begin{aligned} W(i_{1,1}, i_{1,2}, i_{2,1}, i_{2,2}) &= (W_{1,1}(i_{1,1}) W_{2,1}(i_{2,1})) \otimes \\ &\quad (W_{1,2}(i_{1,2}) W_{2,2}(i_{2,2})) \\ &= (W_{1,1}(i_{1,1}) \otimes W_{1,2}(i_{2,2})) \\ &\quad (W_{2,1}(i_{2,1}) \otimes W_{2,2}(i_{2,2})) \end{aligned} \quad \text{(Equation 2)}$$

Given a precoding codebook (a set of precoding matrices $W(i_{1,1}, i_{1,2}, i_{2,1}, i_{2,2})$), a UE measures a CSI-RS in a subframe designated to carry CSI-RS, calculates a CSI (including PMI, RI, and CQI where each of these three CSI parameters can include multiple components) based on the measurement, and reports the calculated CSI to a serving eNB 102. This PMI represents an index of a recommended precoding matrix in the precoding codebook. Different precoding codebooks can be used for different values of RI.

Another example embodiment assumes that a precoder in a designated codebook can be described in (3), termed the partial Kronecker Product (partial KP) codebook. The subscripts m and n in $W_{m,n}(i_{m,n})$ denote precoding stage (first or second stage) and dimension (first or second dimension), respectively. Each of the precoding matrices $W_{m,n}$ is a function of an index which serves as a PMI component. Thus, the precoding matrix W can be described as a function of 3 PMI components $i_{1,1}$, $i_{1,2}$, $i_2$ as follows.

$$W(i_{1,1}, i_{1,2}, i_2) = (W_{1,1}(i_{1,1}) \otimes W_{1,2}(i_{1,2}))(W_2(i_2)) \quad \text{(Equation 3)}$$

Similar to the previous codebook embodiment, a UE measures a CSI-RS in a subframe designated to carry CSI-RS, calculates a CSI (including PMI, RI, and CQI where each of these three CSI parameters can include multiple components) based on the measurement, and reports the calculated CSI to a serving eNB 102.

In either of the above two embodiments, the number of columns of $W_{1,1}$ and $W_{1,2}$ can be perceived as the number of basis vectors, or the number of spatial beams associated with a first and a second dimensions, $N_{b,1}$ and $N_{b,2}$ for the second-stage precoder(s). To adapt to changes in long-term channel statistics such as AoD profiles, these two parameters can be configurable for a UE. Changing the values of $N_{b,1}$ and $N_{b,2}$ amounts to reconfiguring the codebook for the UE. Configuring these parameters can also be done implicitly, such as by configuring a codebook selection parameter which corresponds to at least one of these two codebook parameters.

The above description of embodiments is especially suitable when the serving eNB transmits non-precoded CSI-RS (NP CSI-RS). That is, a cell-specific one-to-one mapping between CSI-RS port and TXRU (transceiver unit) is utilized. Here, different CSI-RS ports have the same wide beam width and direction and hence generally cell wide coverage. Another type of CSI-RS applicable to FD-MIMO is beamformed CSI-RS (BF CSI-RS). In this case, beamforming operation, either cell-specific or UE-specific, is applied on a non-zero-power (NZP) CSI-RS resource (including multiple ports). Here, at least at a given time/frequency CSI-RS ports have narrow beam widths and hence not cell wide coverage, and (at least from the eNB perspective) at least some CSI-RS port-resource combinations have different beam directions. This beamforming operation is intended to increase CSI-RS coverage or penetration. In addition, when UE-specific beamforming is applied to a CSI-RS resource (termed the UE-specific or UE-specifically beamformed CSI-RS), CSI-RS overhead reduction can be obtained when NZP CSI-RS resources are allocated efficiently through resource sharing (pooling) for multiple UEs either in time domain (for instance, aperiodic transmission), beam domain (UE-specific beamforming), or dynamic CSI-RS resource (re)configuration. When a UE is configured to receive BF CSI-RS from a serving eNB, the UE can be configured to report PMI parameters associated with $W_2$ ($W_{2,1}$ and/or $W_{2,2}$) without $W_1$ ($W_{1,1}$ and/or $W_{1,2}$).

Each of the above CSI-RS configurations requires a different transmission strategy which potentially requires a different CSI reporting format for a configured CSI reporting mode. In addition to these factors, the 2D pattern of codebook mapped to CSI-RS ports also determines the CSI reporting format. In particular, a flexible configuration mechanism which allows a serving eNB to configure a UE with NP CSI-RS and UE-specific BF CSI-RS on a subframe basis is beneficial. This can improve system performance through CSI-RS overhead reduction, inter-cell interference reduction, and coverage improvement.

In scenarios where DL long-term channel statistics can be measured through UL signals at a serving eNB, UE-specific BF CSI-RS can be readily used. This is typically feasible when UL-DL duplex distance is sufficiently small. When this condition does not hold, however, some UE feedback can be utilized for the eNB to obtain an estimate of DL long-term channel statistics (or any of its representation thereof). To facilitate such a procedure, a first BF CSI-RS transmitted with periodicity T1 (ms) and a second NP CSI-RS transmitted with periodicity T2 (ms), where T1≤T2. This approach can be termed the hybrid CSI-RS. The implementation of hybrid CSI-RS is largely dependent on the definition of CSI process and NZP CSI-RS resource.

Terms such as 'non-precoded' (or 'NP') CSI-RS and 'beamformed' (or 'BF') CSI-RS are used throughout the present disclosure. The essence of the present disclosure does not change when different terms or names are used to refer to these two CSI-RS types. For example, 'CSI-RS-A' and 'CSI-RS-B' can refer to or be associated with these two CSI-RS types. Essentially they are a first CSI-RS and a second CSI-RS. In another example, CSI-RS resource type can be used to differentiate those two modes of operation instead of CSI-RS type. CSI-RS resources associated with these two types of CSI-RS can be referred to as 'a first CSI-RS resource' and 'a second CSI-RS resource', or 'CSI-RS-A resource' and 'CSI-RS-B resource'. Subsequently, the labels 'NP' and 'BF' (or 'np' and 'bf') are example and can be substituted with other labels such as '1' and '2', or 'A' and 'B', or TYPE1 and TYPE2, or CLASS-A and CLASS-B. In another example, a MIMO type or eMIMO-Type which can be associated with CSI reporting operation can be used to differentiate those two modes of operation instead of CSI-RS type. In this case, a UE is configured with a MIMO type or eMIMO-Type associated with CSI reporting behaviors and, in addition, CSI measurement behaviors.

Therefore, there is a need to design a CSI reporting mechanism which flexibly accommodates both NP and BF CSI-RS. In particular, a common set of components, such as CSI process and CSI-RS resource configuration mechanisms, are utilized to facilitate transmission, reception, and measurement of, as well as CSI reporting associated with either NP CSI-RS or BF CSI-RS. In addition, scenarios where a UE s configured with both NP CSI-RS and BF CSI-RS, that is, hybrid CSI-RS, can be supported as well.

For this purpose, various embodiments of the present disclosure include three components: CSI-RS resource configuration mechanism (including its associated DL signaling), CSI process configuration mechanism, and CSI reporting content.

The first component, CSI-RS resource configuration mechanism, is provided as follows in an embodiment. First, a CSI-RS resource is associated with the number of CSI-RS ports which is defined per non-zero-power (NZP) CSI-RS resource within a given (single) CSI process. For deployments with 2D antenna array, this number of CSI-RS ports is associated with a 2D CSI-RS port pattern which corresponds to a 2D codebook used for CSI reporting. In terms of eNB implementation, different 2D CSI-RS patterns can signify different choices of TXRU-to-CSI-RS virtualization. Therefore, one configuration which is used to characterize a NZP CSI-RS resource for a given UE is the association between a total number of CSI-RS ports and a 2D CSI-RS port pattern. That is, a given number of CSI-RS ports (which is a part of NZP CSI-RS resource configuration) can be associated with one or more 2D CSI-RS port patterns. This association can be implemented in several example embodiments.

A first example embodiment is based on a few parameters from the 2D CSI-RS port pattern, such as the values of $M_a$ and $N_a$. For instance, for a total number of 16 CSI-RS ports (including both polarization groups for dual-polarized array), $(M_a, N_a)=(8,1), (4,2), (2,4),$ or $(1,8)$ is possible where $M_a$ and $N_a$ are the number of rows and columns of the 2D CSI-RS port pattern, respectively. Therefore, a 16-port CSI-RS can be associated with one of the 4 possible 2D CSI-RS port patterns. If longer-first indexing 410 or shorter-first indexing 420 (in FIG. 4) is used, only two possible 2D patterns are required: (2,4), or (1,8). Likewise, for a total number of 8 CSI-RS ports (including both polarization groups), $(M_a, N_a)=(4,1), (2,2),$ or $(1,4)$ is possible. With such a restriction on port indexing, an 8-port CSI-RS can be associated with one of the 3 possible 2D patterns. If longer-first indexing 410 or shorter-first indexing 420 (in FIG. 4) is used, only two possible 2D patterns are required: (2,2), or (1,4). Likewise, for a total number of 12 CSI-RS ports (including both polarization groups), $(M_a,N_a)=(6,1), (2,3),$ (3,2), or (1,6) is possible. Therefore, a 12-port CSI-RS can be associated with one of the 4 possible 2D patterns. If longer-first indexing 410 or shorter-first indexing 420 (in FIG. 4) is used, only two possible 2D patterns are required: (2,3) or (1,6). If single-polarized antenna array is also supported in addition to dual-polarized, a 2D CSI-RS pattern is characterized by ($M_a$, $N_a$, $P_a$) where $P_a$ is 1 for single-polarized array or 2 for dual-polarized array.

In the preceding and following descriptions, the 2D CSI-RS port pattern and the associated parameters ($M_a$, $N_a$, and, if applicable, $P_a$) of the 2D CSI-RS port pattern can instead be implemented as a part of the description of a 2D codebook. Therefore, $M_a$, $N_a$, and, if applicable, $P_a$) can be defined as 2D codebook parameters.

These parameters ($M_a$, $N_a$, and $P_a$ when applicable) can be defined separately or jointly. In addition, since one of these parameters can be inferred from the other parameter(s) for a given number of CSI-RS antenna ports $N_{PORT}$, one of these parameters does not need to be explicitly signaled from a serving eNB to a UE (since $2M_aN_a=N_{PORT}$ or $M_aN_aP_a=N_{PORT}$). For instance, for dual-polarized array, only $M_a$ needs to be signaled for a given $N_{PORT}$ and $N_a$ can be inferred as $N_{PORT}/2M_a$. In another example, only $N_a$ needs to be signaled for a given $N_{PORT}$ and $M_a$ can be inferred as $N_{PORT}/2N_a$.

As previously described, for 2D dual-polarized array, a codebook associated with a 2D pattern of $M_a$ rows, $N_a$ columns, and dual-polarization (hence 2 ports per row-column combination) can be constructed from a Kronecker product between two 1D codebooks: a 1D dual-polarized codebook for $2N_a$ antenna ports ($N_a$ columns) and a 1D single-polarized codebook for $M_a$ antenna ports ($M_a$ rows). This holds either for $W_1$ codebook only (for instance, for precoding structure described in equation (3)), or both $W_1$ and $W_2$ codebooks (for instance, for precoding structure described in equation (2)). Therefore, a second example embodiment associating the number of CSI-RS ports and the 2D pattern (either CSI-RS port pattern or codebook pattern) is to use a codebook (or sub-codebook) enumeration or indexing which denotes a choice of codebook for a given total number of CSI-RS ports. In this case, a codebook choice or codebook subset choice index/parameter (e.g. 0, 1, 2, or 3) can be associated with ($M_a$, $N_a$)=(8,1), (4,2), (2,4), or (1,8) for a total number of 16 CSI-RS ports. Likewise, a codebook choice index/parameter (for instance, 0, 1, 2, or 3) can be associated with ($M_a$, $N_a$)=(6,1), (3,2), (2,3), or (1,6) for a total number of $N_{PORT}=12$ CSI-RS ports. Likewise, a codebook choice index/parameter (for instance, 0, 1, or 2) can be associated with ($M_a$, $N_a$)=(4,1), (2,2), or (1,4) for a total number of $N_{PORT}=8$ CSI-RS ports. In another example, a codebook choice or codebook subset choice index/parameter can be used to indicate all possible combinations of ($M_a$, $N_a$) which span all possible values of $N_{PORT}$. Analogous to the first embodiment, if longer-first indexing 410 or shorter-first indexing 420 (for instance, as illustrated in FIG. 4) is used, the number of codebook or codebook subset choice hypotheses can be reduced accordingly. This association is to be configured by a serving eNB for a UE.

The above characterization holds for both NP CSI-RS (or 'CLASS A'/'nonPrecoded'eMIMO-Type) and UE-specific BF CSI-RS (or 'CLASS B'/'beamformed' eMIMO-Type with 1 NZP CSI-RS resource). To configure a UE with both NP CSI-RS and UE-specific CSI-RS, two sets of associations can be used: one for NP CSI-RS, another for UE-specific BF CSI-RS. For instance, a serving eNB configures a UE with $N_{PORT}$ NP CSI-RS ports and ($M_a$, $N_a$) 2D NP CSI-RS pattern, as well as $N_{PORT,BF}$ UE-specific BF CSI-RS ports and ($M_{BF}$, $N_{BF}$) 2D UE-specific BF CSI-RS pattern. Since UE-specific beamforming operation reduces the number of ports, $N_{PORT,BF} \leq N_{PORT}$, $M_{BF} \leq M_a$, and $N_{BF} \leq N_a$ (where $2M_{BF}N_{BF}=N_{PORT,BF}$ or $M_{BF}N_{BF}P_a=N_{PORT,BF}$).

For UE-specific BF CSI-RS, another option for such association is to use 1D UE-specific BF CSI-RS parametrization pattern. This is especially applicable for codebook designs described in equation (3). In this case, each of the CSI-RS beams (or beam directions) is simply treated as a CSI-RS port. In this case, the 2D rectangular (which inherently assumes the Kronecker product structure) port pattern is not maintained. For this second option, a UE-specific BF CSI-RS configuration can be associated only with one parameter: $N_{PORT,BF}$. Therefore, only the number of ports $N_{PORT,BF}$ is a required parameter. For dual-polarized array, $N_{PORT,BF}$ can be a multiple of 2. Similar to that for NP CSI-RS, codebook (or sub-codebook or codebook subset) enumeration or indexing which denotes a choice of codebook for a given total number of UE-specific BF CSI-RS ports can also be used. In this case, a codebook choice index/parameter (for instance, 0, 1, 2, 3, . . . ) can be associated with different values of ($M_{BF}$, $N_{BF}$) for a given total number of ports $2M_{BF}N_{BF}=N_{PORT,BF}$ when 2D rectangular (Kronecker) BF CSI-RS parametrization pattern is used. In another example, a codebook choice index/parameter can be used to indicate all possible combinations of ($M_{BF}$, $N_{BF}$) which span all possible values of $N_{PORT,BF}$. When BF CSI-RS ports can be specified by $N_{PORT,BF}$ alone (1D port parametrization pattern), either codebook (or sub-codebook) index/indicator alone or $N_{PORT,BF}$ alone is sufficient for characterizing UE-specific BF CSI-RS (or 'CLASS B'/'beamformed' eMIMO-Type with 1 NZP CSI-RS resource) resource.

These association configuration parameters can be signaled to a UE either semi-statically via higher-layer (RRC) signaling or dynamically by signaling the associated parameter (a 2D pattern or its indicator) through a DL control channel such as PDCCH or ePDCCH. For example, if the 2D pattern and its parameters are defined as a part of CSI-RS pattern configuration, they can be associated with a higher-layer (RRC) configuration antennaPorts2DPattern. If the 2D pattern and its parameters are defined as a part of 2D codebook configuration, they can be associated with a higher-layer (RRC) configuration Codebook2DPattern.

Semi-static signaling or configuration can be done as a part of CSI process definition and/or CSI-RS resource configuration. In one embodiment, these two sets of associations (one for NP CSI-RS, another for UE-specific BF CSI-RS) are included in a same NZP CSI-RS resource configuration. In another embodiment, two separate NZP CSI-RS resource configurations (one for NP CSI-RS, another for UE-specific BF CSI-RS) are defined in a same CSI-RS process assigned to the UE. In yet another embodiment, a UE is configured with two separate CSI processes, one associated with a NZP CSI-RS resource for NP CSI-RS, another associated with a NZP CSI-RS resource for UE-specific BF CSI-RS.

In semi-static configuration, parameters which define the configuration of CSI-RS ports (for both NP and BF CSI-RS) are included in the RRC configuration and hence signaled semi-statically to each UE.

Dynamic signaling can be done by including those parameters in a DL assignment or an UL grant: either ($N_{PORT}$, $M_a$, $N_a$), or ($N_{PORT,BF}$, $M_{BF}$, $N_{BF}$), or both sets. If 2D BF CSI-RS port parametrization pattern is not maintained for BF CSI-RS, ($N_{PORT,BF}$, $M_{BF}$, $N_{BF}$) can be replaced by $N_{PORT,BF}$ alone.

A combination or a joint use between semi-static and dynamic signaling can also be used. For instance, one option for NP CSI-RS operation is to signal the mapping between ($M_a$, $N_a$) and number of NP CSI-RS ports $N_{PORT}$ via higher layer/RRC signaling (hence only two of the three parameters need to be signaled). The higher layer signaling can be made a part of NZP CSI-RS resource definition. The number of BF CSI-RS ports $N_{PORT,BF}$ (or beams) and/or ($M_{BF}$, $N_{BF}$) (if 2D BF CSI-RS port parametrization pattern is maintained) are signaled dynamically (hence only two of the three parameters need to be signaled). If 2D BF CSI-RS port parametrization pattern is not maintained, only $N_{PORT,BF}$ is dynamically signaled.

In the above designs of CSI-RS resource configuration mechanism, any of the following CSI-RS port and port numbering schemes can be used.

A first scheme utilizes one set of port numbers for NP CSI-RS and another set of port numbers for BF CSI-RS which is distinct from that used for NP CSI-RS. For example, the set of port numbers for NP CSI-RS can be an extension of port numbers reserved for CSI-RS in the current release of LTE (for instance, Rel. 12): {15, 16, 17, . . . , 14+$N_{PORT}$}. The set of port numbers for UE-specific BF CSI-RS can be taken from a pool of antenna port numbers {115, 116, 117, . . . , 114+$N_{MAX,PORT,BF}$} where $N_{MAX,PORT,BF}$ denotes the maximum number of BF CSI-RS antenna ports or the total size of antenna port pool that is shared by all RRC_CONNECTED UEs configured with BF CSI-RS.

At least two options exist in this first port numbering scheme. A first option is to use a same set of antenna port numbers for all RRC_CONNECTED UEs configured with BF CSI-RS. In this case, $N_{MAX,PORT,BF}$ is the maximum number of BF CSI-RS ports that can be allocated to one UE (for instance, 8). All those UEs configured with BF CSI-RS utilize antenna ports {115, 116, 117, . . . , 114+$N_{MAX,PORT,BF}$}. Although the set of antenna ports can be common for at least some UEs, UE-specific beamforming is used for each of those UEs. In addition, the number of ports can be different for different UEs. That is, a UE configured with BF CSI-RS utilizes {115, 116, . . . , 114+$N_{PORT,BF}$}. For instance, two UEs with $N_{PORT,BF}$=4 are assigned a common subset {115, 116, 117, 118} while a third UE with $N_{PORT,BF}$=2 is assigned {115, 116}. A second option is to define a large set of antenna ports {115, 116, 117, . . . , 114+$N_{MAX,PORT,BF}$} where a UE is configured with a subset of this size-$N_{MAX,PORT,BF}$ set. While there can be overlap between the sets associated with two UEs, two UEs can be assigned with different subsets. For instance, a first UE with $N_{PORT,BF}$=4 is assigned {115, 116, 117, 118} while a second UE with $N_{PORT,BF}$=4 is assigned {117, 118, 119, 120}. Therefore, a subset of BF CSI-RS ports assigned to a UE can be UE-specific in addition to the associated beamforming. The set of antenna port numbers {115, 116, 117, . . . , 114+$N_{MAX,PORT,BF}$} is exemplary. Any set {σ, σ+1, σ+2, . . . , σ+$N_{MAX,PORT,BF}$−1} where σ not equal to 0, 5, 6, 7, 15, or 107 can be used.

A second port numbering scheme utilizes a same set of port numbers for NP CSI-RS and BF CSI-RS. For example, the set of port numbers for NP CSI-RS can be an extension of port numbers reserved for CSI-RS in Rel. 12: {15, 16, 17, . . . , 14+$N_{PORT}$}. Since $N_{PORT,BF}$<$N_{PORT}$, a UE configured with $N_{PORT,BF}$-port BF CSI-RS utilizes {15, 16, . . . , 14+$N_{PORT,BF}$}. Although the set of antenna ports can be common for at least some UEs, UE-specific beamforming is used for each of those UEs. In addition, a UE-specific BF CSI-RS is differentiated from other types of CSI-RS by the number of UE-specific BF CSI-RS ports (smaller than the number of NP CSI-RS ports) as well as the associated beamforming vector or matrix applied to BF CSI-RS.

A second component for enabling a CSI reporting mechanism which flexibly accommodates both NP and BF CSI-RS is a CSI process configuration mechanism. In the present disclosure, three embodiments of CSI process and NZP CSI-RS resource configurations are considered. First, one CSI process with one NZP CSI-RS resource. Second, one CSI process with two NZP CSI-RS resources. Third, one CSI process with one NZP CSI-RS resource. Third, two CSI processes with one NZP CSI-RS resource per CSI process (hence a total of two NZP CSI-RS resources). In addition, another embodiment of hybrid CSI-RS where partial-port NP CSI-RS (instead of full mapping where all NP CSI-RS ports are transmitted in every CSI-RS subframe) is multiplexed with BF CSI-RS is described.

In the first embodiment (embodiment 1), a UE is configured with only one CSI process and one NZP CSI-RS resource. This single CSI process, as well as this single NZP CSI-RS resource, is utilized for both NP CSI-RS and BF CSI-RS. One possible restriction is that NP CSI-RS cannot be transmitted together with UE-specific BF CSI-RS within a same subframe. One example CSI process configuration is described in TABLE 3. A new configuration design is needed for NZP CSI-RS resource which includes both NP CSI-RS and BF CSI-RS.

TABLE 3

CSI process configuration for the first embodiment
CSI-Process information elements

```
-- ASN1START
CSI-Process-CSI-RS-r13 ::=      SEQUENCE {
    csi-ProcessId-r13               CSI-ProcessId-r13,
    csi-RS-ConfigNZPId-r13          CSI-RS-ConfigNZPId-r13,
    csi-IM-ConfigId-r13             CSI-IM-ConfigId-r13,
    p-C-AndCBSRList-r13             SEQUENCE (SIZE (1..2)) OF P-C-AndCBSR-r13,
    cqi-ReportBothProc-r13          CQI-ReportBothProc-r13    OPTIONAL,       --
Need OR
    cqi-ReportPeriodicProcId-r13    INTEGER (0..maxCQI-ProcExt-r13)   OPTIONAL,
    -- Need OR
    cqi-ReportAperiodicProc-r13     CQI-ReportAperiodicProc-r13   OPTIONAL,   --
Need OR
    ...,
    ...
}
-- ASN1STOP
```

Several example higher-layer (RRC) configurations for a single NZP CSI-RS resource which includes both NP CSI-RS and BF CSI-RS are described in TABLE 4, 5, 6, and 7. The names and enumerations (when applicable) of the new RRC parameters are example and illustrative.

In a first example (TABLE 4), within one NZP CSI-RS resource, two separate configurations for NP CSI-RS and BF CSI-RS are defined. Each configuration includes a number of antenna ports, a 2D CSI-RS/antenna port pattern indicator (or, in another example, a 2D codebook pattern), a resource configuration, and a subframe configuration. As explained above, the 2D antenna port pattern can either be represented by either $M_a$ or $N_a$ described above; or a codebook or a codebook subset selection indicator. Guidelines and value restrictions for these two configurations follow the description for the first component. For example, $N_{PORT,BF} \leq N_{PORT}$, $M_{BF} \leq M_a$, and $N_{BF} \leq N_a$. In this case, the number of antenna ports and the 2D CSI-RS port pattern for BF CSI-RS are by default semi-statically configured. In a second example (TABLE 5), the 2D CSI-RS port pattern for BF CSI-RS is replaced by a number of CSI-RS ports—following codebook description in equation (3). In a third example (TABLE 6), NZP CSI-RS resource configuration is similar to that in the first or the second example, except that the number of antenna ports (and, if applicable, the 2D CSI-RS port pattern for BF CSI-RS) are not configured using this mechanism. For this third example, the number of antenna ports (and, if applicable, the 2D CSI-RS port pattern for BF CSI-RS) are dynamically configured via DL control signaling. For these three embodiments, antennaPorts2DPattern-NP-r13 can include either one value (representing one of the two dimensions) or two values (representing both dimensions). If the number of antenna ports is included in this configuration, only one value (representing only one of the two dimensions) is needed in antennaPorts2DPattern-r13. On the other hand, if the number of antenna ports is not included in this configuration, two values (representing only one of the two dimensions) can be used in antennaPorts2DPattern-r13. In a fourth example (TABLE 7), only one type of CSI-RS (either NP or BF) can be configured for a particular UE. In this case, an RRC parameter csi-RS-Type-r13 can be used to specify the CSI-RS type. In another example, as mentioned above, a MIMO Type such as eMIMO-Type can be used for this purpose. Furthermore, antennaPorts2DPattern-r13 is only applicable for NP CSI-RS since BF CSI-RS is specified by only the number of ports. In all these embodiments, the range of the number of antenna ports (in antennaPortsCount) is exemplary. For example, the range can be further restricted to {an1, an2, an4, an8, an12, an16}.

TABLE 4

NZP CSI-RS resource configuration for embodiment 1, example 1
CSI-RS-ConfigNZP information elements

```
-- ASN1START
CSI-RS-ConfigNZP-r13 ::=        SEQUENCE {
    csi-RS-ConfigNZPId-r13          CSI-RS-ConfigNZPId-r13,
    antennaPortsCount-NP-r13        ENUMERATED {an1, an2, an4, an6, an8, an10, an12,
an14, an16},
    antennaPorts2DPattern-NP-r13    ENUMERATED {...} // indicating 2D antenna port pattern
    resourceConfig-NP-r13           INTEGER (0..31),
    subframeConfig-NP-r13           INTEGER (0..154),
    antennaPortsCount-BF-r13        ENUMERATED {an1, an2, an4, an6, an8, an10, an12,
an14, an16},
    antennaPorts2DPattern-BF-r13 ENUMERATED {...} // indicating 2D antenna port pattern
    resourceConfig-BF-r13           INTEGER (0..31),
    subframeConfig-BF-r13           INTEGER (0..154),
    scramblingIdentity-r13          INTEGER (0..503),
    ...
}
-- ASN1STOP
```

TABLE 5

NZP CSI-RS resource configuration for embodiment 1, example 2
CSI-RS-ConfigNZP information elements

```
-- ASN1START
CSI-RS-ConfigNZP-r13 ::=        SEQUENCE {
    csi-RS-ConfigNZPId-r13          CSI-RS-ConfigNZPId-r13,
    antennaPortsCount-NP-r13        ENUMERATED {an1, an2 an4, an6, an8, an10, an12, an14,
an16},
    antennaPorts2DPattern-NP-r13    ENUMERATED {...} // indicating 2D antenna port pattern
    resourceConfig-NP-r13           INTEGER (0..31),
    subframeConfig-NP-r13           INTEGER (0..154),
    antennaPortsCount-BF-r13        ENUMERATED {an1, an2, an4 an6, an8, an10, an12, an14,
an16},
    resourceConfig-BF-r13           INTEGER (0..31),
        subframeConfig-BF-r13           INTEGER (0..154),
        scramblingIdentity-r13          INTEGER (0..503),
    ...
}
-- ASN1STOP
```

TABLE 6

NZP CSI-RS resource configuration for embodiment 1, example 3
CSI-RS-ConfigNZP information elements

```
-- ASN1START
CSI-RS-ConfigNZP-r13 ::=      SEQUENCE {
    csi-RS-ConfigNZPId-r13        CSI-RS-ConfigNZPId-r13,
    antennaPortsCount-NP-r13       ENUMERATED {an1, an2, an4, an6, an8, an10, an12,
an14, an16},
    antennaPorts2DPattern-NP-r13   ENUMERATED {...} // indicating 2D antenna port pattern
    resourceConfig-NP-r13          INTEGER (0..31),
    subframeConfig-NP-r13          INTEGER (0..154),
    resourceConfig-BF-r13          INTEGER (0..31),
    subframeConfig-BF-r13          INTEGER (0..154),
    scramblingIdentity-r13         INTEGER (0..503),
    ...
}
-- ASN1STOP
```

TABLE 7

NZP CSI-RS resource configuration for embodiment 1, example 4
CSI-RS-ConfigNZP information elements

```
-- ASN1START
CSI-RS-ConfigNZP-r13 ::=      SEQUENCE {
    csi-RS-ConfigNZPId-r13        CSI-RS-ConfigNZPId-r13,
    csi-RS-Type-r13               ENUMERATED {np, bf}
    antennaPortsCount-r13          ENUMERATED {an1, an2, an4, an6, an8, an10, an12, an14,
an16},
    antennaPorts2DPattern-r13      ENUMERATED {...} // indicating 2D antenna port pattern, only
applicable to NP CSI-RS
    resourceConfig-r13             INTEGER (0..31),
    subframeConfig-r13             INTEGER (0..154),
    scramblingIdentity-r13         INTEGER (0..503),
    ...
}
-- ASN1STOP
```

Figure 5A:
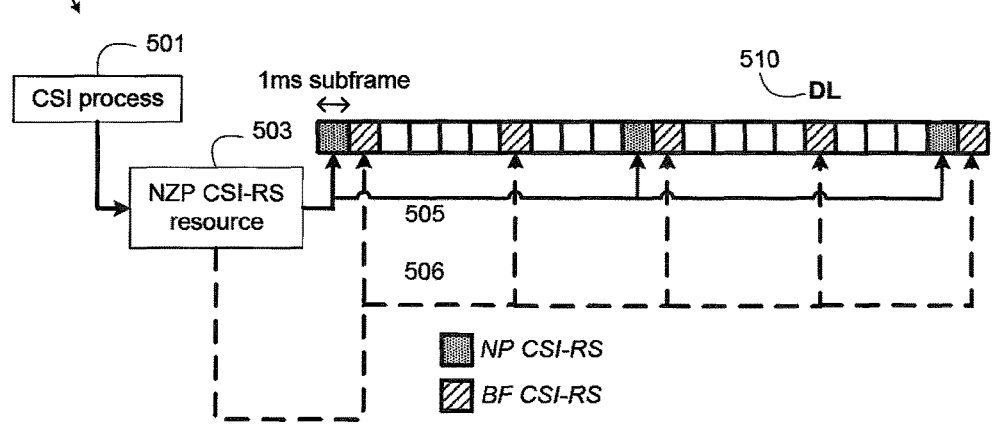
FIG. 5A illustrates an example concurrent or hybrid usage of non-precoded (NP) CSI-RS and beamformed (BF) CSI-RS with one CSI process and one NZP CSI-RS resource according to an embodiment of the present disclosure.

FIG. 5A illustrates an example concurrent or hybrid usage of NP CSI-RS and BF CSI-RS with one CSI process and one NZP CSI-RS resource according to an embodiment of the present disclosure. The embodiment of the concurrent or hybrid usage shown in FIG. 5A is for illustration only. Other embodiments of the concurrent or hybrid usage could be used without departing from the scope of the present disclosure.

Based on the aforementioned CSI process and NZP CSI-RS resource configuration mechanism, NP CSI-RS and BF CSI-RS can be used concurrently according to an example procedure described in embodiment 500 of FIG. 5A:

Within a single CSI process 501 and a single NZP CSI-RS resource 503, a number of ports and a 2D CSI-RS/antenna port (or, in another example, a 2D codebook) pattern designated for NP CSI-RS are configured, along with its associated resource and subframe configurations. This configuration includes the reporting rate and location (in terms of subframe indices) of NP CSI-RS transmission (505) on PDSCH 510. In another example, this NP CSI-RS transmission can be performed aperiodically via a DL control channel.

Within the same CSI process 501 and a single NZP CSI-RS resource 503, a number of ports and a 2D antenna port pattern designated for BF CSI-RS are configured, along with its associated resource and subframe configurations. This configuration dictates the reporting rate and location (in terms of subframe indices) of BF CSI-RS transmission (506) on PDSCH 510. The rate at which BF CSI-RS is transmitted can be higher than (for example, a multiple of) the rate at which NP CSI-RS is transmitted. In another example, this BF CSI-RS transmission can be performed aperiodically via a DL control channel.

For both types of CSI-RS, a same set of CSI reporting modes (both periodic and aperiodic) is configured for a UE. Upon receiving and measuring a NZP CSI-RS resource as well as a CSI-RS type information, the UE reports CSI based on the reporting configuration and the type of CSI-RS. In this embodiment, CSI reporting mode for one CSI process cannot be configured independently (therefore differently) from that for the other. For periodic CSI reporting on PUCCH, CSI reporting rate and subframe shift are shared between the two types of CSI-RS. Two options exist for a UE to report a CSI upon measuring a NP CSI-RS. In a first option, the UE reports a complete set of CSI parameters (that is, CQI, RI, and PMI). In a second option, the UE reports only a partial set of CSI parameters. One example is to report only a CSI parameter pertinent to long-term DL channel statistics such as PMIs associated with the first-stage precoder ($i_{1,H}, i_{1,V}$) or ($i_{1,1}, i_{1,2}$) or simply $i_1$.

If the NZP CSI-RS resource configuration follows TABLE 4, the number of ports for BF CSI-RS is configured semi-statically by default. But if the NZP CSI-RS resource configuration follows TABLE 5, the number of ports for BF CSI-RS is configured dynamically by default. In this case, a dynamic configuration (reconfiguration) capability is performed via DL control signaling. For instance, the number of BF CSI-RS ports a UE measures, along with an indicator associated with the 2D antenna port pattern, can be included in DL assignment. In this case, the value of each of these two indicators (DCI fields) is upper-bounded by its counterpart within its CSI-RS resource configuration. That is, $N_{PORT,BF-D} \leq N_{PORT,BF}$, $M_{BF-D} \leq M_{BF}$, or $N_{BF-D} \leq N_{BF}$ where subscript D signifies dynamic.

In the second embodiment (embodiment 2), a UE is configured with only one CSI processes for a UE. This single CSI process is utilized for both NP CSI-RS and BF CSI-RS. But within this single CSI process, two NZP CSI-RS resources are assigned, one (resource 1) for NP CSI-RS, another (resource 2) for BF CSI-RS. Resource 1 includes of $N_{PORT}$ ports, is associated with a 2D CSI-RS pattern ($M_a$, $N_a$), and is cell-specific. Resource 2 includes of $N_{PORT,BF}$ ports for a given UE. This set can be UE-specifically allocated (different sets for different UEs) or obtained from a common (shared) pool of CSI-RS resources. This shared resource pool, defined to be cell-specific, is used for a UE whenever needed as the UE applies UE-specific beamforming. This option allows a more flexible pooling of BF CSI-RS resources across different UEs. In addition, if NP and BF CSI-RS resources are separately allocated, one can be controlled and configured without affecting the other.

As previously described, a number of CSI-RS ports and a 2D CSI-RS pattern characterize a NZP CSI-RS resource. For BF CSI-RS, two options exist depending on whether these two parameters are configured semi-statically or dynamically. If semi-static configuration via higher layer (RRC) signaling is used, $N_{PORT,BF}$ (or in addition, either $M_{BF}$ or $N_{BF}$) can be included in the NZP CSI-RS resource configuration for BF CSI-RS. If dynamic configuration (for example, via DL assignment on PDCCH or ePDCCH) is used, $N_{PORT,BF}$ (or in addition, either $M_{BF}$ or $N_{BF}$) are not included in the NZP CSI-RS resource configuration for BF CSI-RS since they are dynamically signaled to the UE. For UE-specific BF CSI-RS, another option for such association is to use 1D UE-specific BF CSI-RS parametrization pattern. In this case, each of the CSI-RS beams (or beam directions) is simply treated as one CSI-RS port or a pair of CSI-RS ports (associated with two polarizations). In this case, the 2D rectangular (which inherently assumes the Kronecker product structure) port pattern is not maintained. For this second option, a UE-specific BF CSI-RS configuration can be associated only with one parameter: $N_{PORT,BF}$. Therefore, only the number of ports $N_{PORT,BF}$ is a required parameter. For dual-polarized array, $N_{PORT,BF}$ can be a multiple of 2.

To utilize a configured NZP CSI-RS resource, an explicit CSI-RS indicator can be used. This indicator (termed, for instance, CSI-RS-I) indicates whether a UE assumes reception of NP CSI-RS or BF CSI-RS within a given subframe. CSI-RS-I can be defined as a one-bit indicator which, for example, is set to 0 for NP CSI-RS or 1 for BF CSI-RS. This explicit indicator can be used to facilitate transmissions of aperiodic BF CSI-RS or aperiodic NP CSI-RS. This indicator can be dynamically signaled via downlink assignment. In addition, it can be used to enable hybrid CSI-RS where NP CSI-RS and BF CSI-RS are transmitted in turn. Another embodiment to such an explicit indicator is a CSI-RS pattern or periodic transmission (which includes, e.g. subframe shift and periodicity) configuration. This configuration can be included in NZP CSI-RS resource configuration and hence a semi-static (RRC, higher-layer) configuration. This can take the form of subframe configuration. For example, with 5 ms CSI-RS periodicity, a pattern of $\{0,1,1,1\}$ represents a 5 ms×4=20 ms periodicity where NP CSI-RS, BF CSI-RS, BF CSI-RS, and BF CSI-RS are transmitted periodically. Yet another embodiment is to utilize either two explicit CSI-RS-I's or two CSI-RS transmission patterns—one for NP CSI-RS, another for BF CSI-RS. The use of two indicators or transmission patterns allows a serving eNB to transmit both NP CSI-RS and BF CSI-RS within a same subframe. This is relevant for some TDD scenarios especially when a TDD subframe configuration only supports a small number of DL subframes. In this case, CSI reporting associated with the two types of CSI-RS within the same subframe can be reported in different UL subframes.

Several example higher-layer (RRC) configurations are described in TABLE 8 and 9. The first example (TABLE 8) defines one CSI reporting configuration for both types of CSI-RS. The second example (TABLE 9) defines two independent CSI reporting configurations, one for NP CSI-RS, another for BF CSI-RS. In the first and second examples, two CSI-RS configurations csi-RS-ConfigNZPId-NP-r13 (for NP CSI-RS) and csi-RS-ConfigNZPId-BF-r13 (for BF CSI-RS) are defined independently. The third example (TABLE 10) defines one CSI reporting configuration for both types of CSI-RS. In addition, the number of NZP CSI-RS resources associated with this CSI process is made variable (either 1 or 2). This allows a serving eNodeB to configure a UE with one of the following three possibilities: 1) CSI process including only NP CSI-RS (1 NZP CSI-RS resource configuration), 2) CSI process including only BF CSI-RS (1 NZP CSI-RS resource configuration), 3) CSI process including both NP and BF CSI-RS (2 NZP CSI-RS resource configurations). NZP CSI-RS resource configuration follows any of the other embodiments (for instance, TABLE 14, 15, 16, or 17). TABLE 11 describes a fourth example CSI process configuration which is a variation of TABLE 8. In this embodiment, two CSI-IM configurations are used: one for NP CSI-RS, another for BF CSI-RS. As previously mentioned, the labels 'NP' and 'BF' are example and can be substituted with other labels.

TABLE 8

CSI process configuration for embodiment 2, example 1
CSI-Process information elements

```
-- ASN1START
CSI-Process-r13 ::=     SEQUENCE {
    csi-ProcessId-r13           CSI-ProcessId-r13,
    csi-RS-ConfigNZPId-NP-r13   CSI-RS-ConfigNZPId-NP-r13,
    csi-RS-ConfigNZPId-BF-r13   CSI-RS-ConfigNZPId-BF-r13,
    csi-IM-ConfigId-r13         CSI-IM-ConfigId-r13,
    p-C-AndCBSRList-r13         SEQUENCE (SIZE (1..2)) OF P-C-AndCBSR-r13,
    cqi-ReportBothProc-r13      CQI-ReportBothProc-r13        OPTIONAL,    -- Need
OR
    cqi-ReportPeriodicProcId-r13 INTEGER (0..maxCQI-ProcExt-r13)  OPTIONAL,    --
```

TABLE 8-continued

CSI process configuration for embodiment 2, example 1
CSI-Process information elements Need OR
    cqi-ReportAperiodicProc-r13 CQI-ReportAperiodicProc-r13    OPTIONAL,    -- Need OR
    ...,
    ...
}
-- ASN1STOP

TABLE 9

CSI process configuration for embodiment 2, example 2
CSI-Process information elements -- ASN1START
CSI-Process-r13 ::=    SEQUENCE {
    csi-ProcessId-r13    CSI-ProcessId-r13,
    csi-RS-ConfigNZPId-NP-r13    CSI-RS-ConfigNZPId-NP-r13,
    csi-RS-ConfigNZPId-BF-r13    CSI-RS-ConfigNZPId-BF-r13,
    csi-IM-ConfigId-r13    CSI-IM-ConfigId-r13,
    p-C-AndCBSRList-r13    SEQUENCE (SIZE (1..2)) OF P-C-AndCBSR-r13,
    cqi-ReportBothProc-NP-r13    CQI-ReportBothProc-NP-r13    OPTIONAL,    -- Need OR
    cqi-ReportPeriodicProcId-NP-r13    INTEGER (0..maxCQI-ProcExt-r13)    OPTIONAL,
    -- Need OR
    cqi-ReportAperiodicProc-NP-r13    CQI-ReportAperiodicProc-NP-r13    OPTIONAL,
    -- Need OR
    cqi-ReportBothProc-BF-r13    CQI-ReportBothProc-BF-r13    OPTIONAL,    -- Need OR
    cqi-ReportPeriodicProcId-BF-r13    INTEGER (0..maxCQI-ProcExt-r13)    OPTIONAL,
    -- Need OR
    cqi-ReportAperiodicProc-BF-r13    CQI-ReportAperiodicProc-BF-r13    OPTIONAL,
    -- Need OR
    ...,
    ...
}
-- ASN1STOP

TABLE 10

CSI process configuration for embodiment 2, example 3
CSI-Process information elements -- ASN1START
CSI-Process-r13 ::=    SEQUENCE {
    csi-ProcessId-r13    CSI-ProcessId-r13,
    numCSI-RS-ConfigNZP-r13    INTEGER (1, 2),
    csi-IM-ConfigId-r13    CSI-IM-ConfigId-r13,
    p-C-AndCBSRList-r13    SEQUENCE (SIZE (1..2)) OF P-C-AndCBSR-r13,
    cqi-ReportBothProc-r13    CQI-ReportBothProc-r13    OPTIONAL,    -- Need OR
    cqi-ReportPeriodicProcId-r13    INTEGER (0..maxCQI-ProcExt-r13)    OPTIONAL,    -- Need OR
    cqi-ReportAperiodicProc-r13 CQI-ReportAperiodicProc-r13    OPTIONAL,    -- Need OR
    ...,
    ...
}
-- ASN1STOP

TABLE 11

CSI process configuration for embodiment 2, example 4
CSI-Process information elements -- ASN1START
CSI-Process-r13 ::=    SEQUENCE {
    csi-ProcessId-r13    CSI-ProcessId-r13, TABLE 11-continued CSI process configuration for embodiment 2, example 4
CSI-Process information elements

```
    csi-RS-ConfigNZPId-NP-r13      CSI-RS-ConfigNZPId-NP-r13,
    csi-RS-ConfigNZPId-BF-r13      CSI-RS-ConfigNZPId-BF-r13,
    csi-IM-ConfigId-NP-r13         CSI-IM-ConfigId-NP-r13,
csi-IM-ConfigId-BF-r13             CSI-IM-ConfigId-BF-r13,
    p-C-AndCBSRList-r13            SEQUENCE (SIZE (1..2)) OF P-C-AndCBSR-r13,
    cqi-ReportBothProc-r13         CQI-ReportBothProc-r13           OPTIONAL,       -- Need
OR
    cqi-ReportPeriodicProcId-r13 INTEGER (0..maxCQI-ProcExt-r13)    OPTIONAL,       --
Need OR
    cqi-ReportAperiodicProc-r13 CQI-ReportAperiodicProc-r13         OPTIONAL,       -- Need
OR
    ...,
    ...
}
-- ASN1STOP
```

Figure 5B:
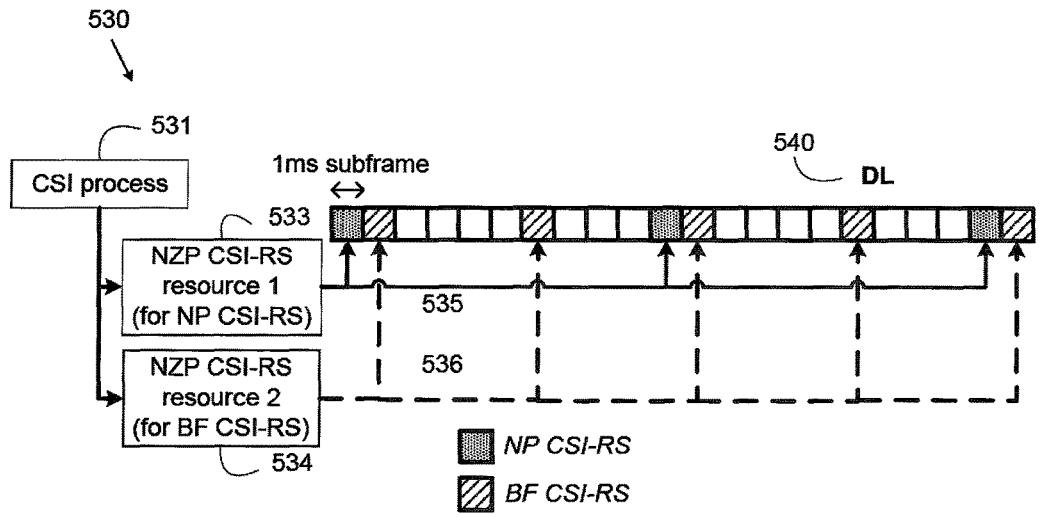
FIG. 5B illustrates an example concurrent or hybrid usage of NP CSI-RS and BF CSI-RS with one CSI process and two NZP CSI-RS resources according to an embodiment of the present disclosure.

FIG. 5B illustrates an example concurrent or hybrid usage of NP CSI-RS and BF CSI-RS with one CSI process and two NZP CSI-RS resources according to an embodiment of the present disclosure. The embodiment of the concurrent or hybrid usage shown in FIG. 5B is for illustration only. Other embodiments of the concurrent or hybrid usage could be used without departing from the scope of the present disclosure.

Based on the aforementioned CSI process and NZP CSI-RS resource configuration mechanism, NP CSI-RS and BF CSI-RS can be used concurrently according to an example procedure described in embodiment 530 of FIG. 5B:

Within a single CSI process 531, the RRC parameter csi-RS-ConfigNZPId-NP-r13 is used to configure a number of ports and a 2D CSI-RS/antenna port (or, in another example, a 2D codebook) pattern designated for NP CSI-RS, along with its associated resource and subframe configurations. This sets up a first NZP CSI-RS resource 533. This configuration dictates the reporting rate and location (in terms of subframe indices) of NP CSI-RS transmission (535) on PDSCH 540. In another example, this NP CSI-RS transmission can be performed aperiodically via a DL control channel.

Within the same CSI process 531, the RRC parameter csi-RS-ConfigNZPId-BF-r13 is used to configure a number of ports and a 2D antenna port pattern designated for BF CSI-RS, along with its associated resource and subframe configurations. This sets up a second NZP CSI-RS resource 534. This configuration dictates the reporting rate and location (in terms of subframe indices) of BF CSI-RS transmission (536) on PDSCH 540. The rate at which BF CSI-RS is transmitted can be higher than (for example, a multiple of) the rate at which NP CSI-RS is transmitted. In another example, this BF CSI-RS transmission can be performed aperiodically via a DL control channel.

For each of the two NZP CSI-RS resources, a corresponding set of CSI reporting modes (both periodic and aperiodic) is configured for a UE. Upon receiving and measuring a NZP CSI-RS resource, the UE reports CSI based on the reporting configuration and the type of CSI-RS. In this embodiment, CSI reporting mode for one CSI process can be configured independently (therefore differently) from that for the other. For periodic CSI reporting on PUCCH, CSI reporting rate and subframe shift can be configured independently as well. Two options exist for a UE to report a CSI upon measuring a NP CSI-RS. In a first option, the UE reports a complete set of CSI parameters (that is, CQI, RI, and PMI). In a second option, the UE reports only a partial set of CSI parameters. One example is to report only a CSI parameter pertinent to long-term DL channel statistics such as PMIs associated with the first-stage precoder ($i_{1,H}, i_{1,V}$) or ($i_{1,1}, i_{1,2}$) or simply $i_1$.

The number of ports for BF CSI-RS is configured as a part of CSI-RS resource configuration in both csi-RS-ConfigNZPId-NP-r13 and csi-RS-ConfigNZPId-BF-r13. Therefore, the number of ports is configured semi-statically by default. Although a semi-static configuration is already available in both csi-RS-ConfigNZPId-r13 and csi-RS-ConfigNZPId-BF-r13, a dynamic configuration (reconfiguration) capability can also be added via DL control signaling. For instance, the number of BF CSI-RS ports a UE measures, along with an indicator associated with the 2D antenna port pattern, can be included in DL assignment. In this case, the value of each of these two indicators (DCI fields) is upper-bounded by its counterpart within its CSI-RS resource configuration. That is, $N_{PORT,BF-D} \leq N_{PORT,BF}$, $M_{BF-D} \leq M_{BF}$, or $N_{BF-D} \leq N_{BF}$ where subscript D signifies dynamic.

In the third embodiment (embodiment 3), a UE is configured with two CSI processes: one for NP CSI-RS, another for BF CSI-RS. For each of the two CSI processes, a single NZP CSI-RS resource is configured.

Several example higher-layer (RRC) configurations are described in TABLE 12, 13, and 14. Not all the required RRC parameters are shown in these tables. A first example (TABLE 12) introduces a new RRC parameter in CSI-Process-r13 (termed csi-RS-Type-r13 for illustrative purposes) which indicates whether a CSI process is associated with NP or BF CSI-RS. Therefore, csi-RS-Type-r13 is set to 'np' in one CSI process and 'bf' in another. In a second example (TABLE 13), two types of CSI process are defined: CSI-Process-NP-CSI-RS-r13 (associated NP CSI-RS) and CSI-Process-BF-CSI-RS-r13 (associated BF CSI-RS). Since the two CSI processes are essentially independent, this embodiment allows full flexibility in configuring each type of CSI-RS at the expense of extra overhead. In a third example (TABLE 14), rather than defining a CSI-RS type parameter csi-RS-Type-r13, an indicator which defines a CSI reporting type (for illustrative purposes, csi-Report-Type-r13) or class (for illustrative purposes, csi-Report-Class-r13) is used. Therefore the two types or classes of CSI-RS (NP and BF) are implicitly differentiated by means of CSI reporting behavior pertaining to NP CSI-RS and BF CSI-RS. For example, when csi-Report-Type-r13 (or csi-Report-Class-r13) is set to a first value, a CSI report contains PMI values associated with a first stage and a second stage precoding. When csi-Report-Type-r13 (or csi-Report-Class-r13) is set to a second value, a CSI report contains at least one PMI value associated with only the second stage precoding. For example, if $\{i_{1,1}, i_{1,2}, i_{2,1}, i_{2,2}\}$ are the PMI values associated with $\{W_{1,V}, W_{1,H}, W_{2,V}, W_{2,H}\}$ or $\{W_{1,1}, W_{1,2}, W_{2,1}, W_{2,2}\}$, when csi-Report-Type-r13 (or csi-Report-Class-r13) is set to a first value, a CSI report contains PMI values pertaining to $\{i_{1,1}, i_{1,2}, i_{2,1}, i_{2,2}\}$. But when csi-Report-Type-r13 (or csi-Report-Class-r13) is set to a second value, a CSI report contains at least one PMI value pertaining to $\{i_{2,1}, i_{2,2}\}$. Likewise, $\{i_{1,1}, i_{1,2}, i_2\}$ are the PMI values associated with $\{W_{1,V}, W_{1,H}, W_2\}$ or $\{W_{1,1}, W_{1,2}, W_2\}$, when csi-Report-Type-r13 (or csi-Report-Class-r13) is set to a first value, a CSI report contains PMI values pertaining to $\{i_{1,1}, i_{1,2}, i_2\}$. But when csi-Report-Type-r13 (or csi-Report-Class-r13) is set to a second value, a CSI report contains at least one PMI value pertaining to $\{i_2\}$.

TABLE 12

CSI process configuration for embodiment 3: example 1
CSI-Process information elements

```
-- ASN1START
CSI-Process-r13 ::=      SEQUENCE {
    csi-ProcessId-r13           CSI-ProcessId-r13,
    csi-RS-ConfigNZPId-r13      CSI-RS-ConfigNZPId-r13,
    csi-RS-Type-r13        ENUMERATED {np, bf},
    csi-IM-ConfigId-r13         CSI-IM-ConfigId-r13,
    p-C-AndCBSRList-r13         SEQUENCE (SIZE (1..2)) OF P-C-AndCBSR-r13,
    cqi-ReportBothProc-r13   CQI-ReportBothProc-r13         OPTIONAL,          -- Need OR
    cqi-ReportPeriodicProcId-r13    INTEGER (0..maxCQI-ProcExt-r13) OPTIONAL,   --
Need OR
    cqi-ReportAperiodicProc-r13   CQI-ReportAperiodicProc-r13        OPTIONAL,    -- Need
OR
    ...,
    ...
}
-- ASN1STOP
```

TABLE 13

CSI process configuration for embodiment 3: example 2
CSI-Process information elements

```
-- ASN1START
CSI-Process-NP-CSI-RS-r13 ::=       SEQUENCE {
    csi-ProcessId-r13             CSI-ProcessId-r13,
    csi-RS-ConfigNZPId-r13   CSI-RS-ConfigNZPId-r13,
    csi-IM-ConfigId-r13       CSI-IM-ConfigId-r13,
    p-C-AndCBSRList-r13        SEQUENCE (SIZE (1..2)) OF P-C-AndCBSR-r13,
    cqi-ReportBothProc-r13    CQI-ReportBothProc-r13           OPTIONAL,          -- Need OR
    cqi-ReportPeriodicProcId-r13 INTEGER (0..maxCQI-ProcExt-r13)     OPTIONAL,       --
Need OR
    cqi-ReportAPeriodicProc-r13 CQI-ReportAperiodicProc-r13          OPTIONAL,        -- Need
OR
    ...,
    ...
}
CSI-Process-BF-CSI-RS-r13 ::=       SEQUENCE {
    csi-ProcessId-r13             CSI-ProcessId-r13,
    csi-RS-ConfigNZPId-r13   CSI-RS-ConfigNZPId-r13,
    csi-IM-ConfigId-r13       CSI-IM-ConfigId-r13,
    p-C-AndCBSRList-r13        SEQUENCE (SIZE (1..2)) OF P-C-AndCBSR-r13,
    cqi-ReportBothProc-r13       CQI-ReportBothProc-r13        OPTIONAL,          -- Need OR
    cqi-ReportPeriodicProcId-r13    INTEGER (0..maxCQI-ProcExt-r13) OPTIONAL,      --
Need OR
    cqi-ReportAperiodicProc-r13    CQI-ReportAperiodicProc-r13        OPTIONAL,      -- Need
OR
    ...,
    ...
}
-- ASN1STOP
```

TABLE 14

CSI process configuration for embodiment 3: example 4
CSI-Process information elements

```
-- ASN1START
CSI-Process-r13 ::=      SEQUENCE {
    csi-ProcessId-r13              CSI-ProcessId-r13,
    csi-RS-ConfigNZPId-r13   CSI-RS-ConfigNZPId-r13,
  csi-Report-Type-r13    ENUMERATED {...} // indicating CSI reporting type
(or csi-Report-Class-r13)
    csi-IM-ConfigId-r13        CSI-IM-ConfigId-r13,
    p-C-AndCBSRList-r13        SEQUENCE (SIZE (1..2)) OF P-C-AndCBSR-r13,
    cqi-ReportBothProc-r13     CQI-ReportBothProc-r13       OPTIONAL,       -- Need OR
    cqi-ReportPeriodicProcId-r13   INTEGER (0..maxCQI-ProcExt-r13) OPTIONAL,       --
Need OR
    cqi-ReportAperiodicProc-r13   CQI-ReportAperiodicProc-r13    OPTIONAL,       -- Need
OR
    ...,
    ...
}
-- ASN1STOP
```

TABLE 15 illustrates an example NZP CSI-RS resource configuration. In addition, an RRC parameter which indicates 2D CSI-RS/antenna port or codebook pattern (termed antennaPorts2DPattern-r13 for illustrative purposes) can be introduced as previously discussed. This parameter applies especially for NP CSI-RS and can include either one value (representing one of the two dimensions) or two values (representing both dimensions). If the number of antenna ports is included in this configuration, only one value (representing only one of the two dimensions) is needed in antennaPorts2DPattern-r13. On the other hand, if the number of antenna ports is not included in this configuration, two values (representing only one of the two dimensions) can be used in antennaPorts2DPattern-r13. When used for BF CSI-RS, this parameter can be set to a NULL value. TABLE 16 illustrates another example NZP CSI-RS resource configuration where instead of an RRC parameter indicating 2D CSI-RS port pattern (termed antennaPorts2DPattern-r13 for illustrative purposes), a codebook selection or setting parameter (termed CBSetting-r13 for illustrative purposes) can be introduced. This parameter applies especially for NP CSI-RS but can also be used for BF CSI-RS if needed. TABLE 17 illustrates another example NZP CSI-RS resource configuration where instead of an RRC parameter indicating a 2D CSI-RS/antenna port pattern (termed antennaPorts2DPattern-r13 for illustrative purposes), a codebook selection or setting parameter (termed CBSetting-r13 for illustrative purposes) can be introduced. This parameter applies especially for NP CSI-RS but can also be used for BF CSI-RS if needed. In addition, a CSI-RS type parameter is introduced. TABLE 18 illustrates another example NZP CSI-RS resource configuration where neither an RRC parameter which indicates 2D antenna port pattern (termed antennaPorts2DPattern-r13 for illustrative purposes) nor a codebook selection parameter (termed CBSelect-r13 for illustrative purposes) is utilized. It is assumed that only one codebook is utilized for a given number of antenna ports. The labels 'NP' and 'BF' (or 'np' and 'bf') are example and can be substituted with other labels.

TABLE 14

NZP CSI-RS resource configuration - example 1
CSI-RS-ConfigNZP information elements

```
-- ASN1START
CSI-RS-ConfigNZP-r13 ::=    SEQUENCE {
    csi-RS-ConfigNZPId-r13       CSI-RS-ConfigNZPId-r13,
    antennaPortsCount-r13        ENUMERATED {an1, an2, an4, an6, an8, an10, an12, an14,
an16},
    antennaPorts2DPattern-r13    ENUMERATED {...} // indicating 2D antenna port pattern
    resourceConfig-r13           INTEGER (0..31),
    subframeConfig-r13           INTEGER (0..154),
    scramblingIdentity-r13       INTEGER (0..503),
    ...
}
-- ASN1STOP
```

TABLE 15

NZP CSI-RS resource configuration - example 2
CSI-RS-ConfigNZP information elements

```
-- ASN1START
CSI-RS-ConfigNZP-r13 ::=    SEQUENCE {
    csi-RS-ConfigNZPId-r13       CSI-RS-ConfigNZPId-r13,
```

TABLE 15-continued

NZP CSI-RS resource configuration - example 2
CSI-RS-ConfigNZP information elements

```
        antennaPortsCount-r13       ENUMERATED {an1, an2, an4, an6, an8, an10, an12, an14,
an16},
        CBSetting-r13       ENUMERATED {...} // indicating codebook selection
            resourceConfig-r13          INTEGER (0..31),
            subframeConfig-r13          INTEGER (0..154),
            scramblingIdentity-r13      INTEGER (0..503),
            ...
}
-- ASN1STOP
```

TABLE 16

NZP CSI-RS resource configuration - example 3
CSI-RS-ConfigNZP information elements

```
-- ASN1START
CSI-RS-ConfigNZP-r13 ::=    SEQUENCE {
        csi-RS-ConfigNZPId-r13      CSI-RS-ConfigNZPId-r13,
        antennaPortsCount-r13       ENUMERATED {an1, an2, an4, an6, an8, an10, an12, an14,
an16},
        CBSetting-r13       ENUMERATED {...} // indicating codebook selection
        csi-RS-Type-r13     ENUMERATED {np, bf}
            resourceConfig-r13          INTEGER (0..31),
            subframeConfig-r13          INTEGER (0..154),
            scramblingIdentity-r13      INTEGER (0..503),
            ...
}
-- ASN1STOP
```

TABLE 17

NZP CSI-RS resource configuration - example 4
CSI-RS-ConfigNZP information elements

```
-- ASN1START
CSI-RS-ConfigNZP-r13 ::=    SEQUENCE {
        csi-RS-ConfigNZPId-r13      CSI-RS-ConfigNZPId-r13,
        antennaPortsCount-r13       ENUMERATED {an1, an2, an4, an6, an8, an10, an12, an14,
an16},
            resourceConfig-r13          INTEGER (0..31),
            subframeConfig-r13          INTEGER (0..154),
            scramblingIdentity-r13      INTEGER (0..503),
            ...
}
-- ASN1STOP
```

Figure 5C:
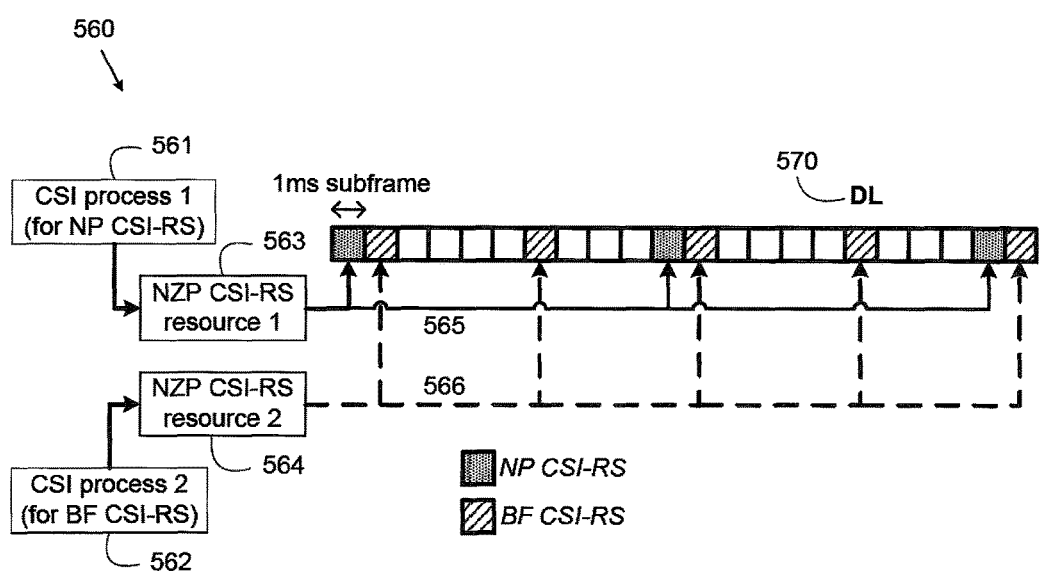
FIG. 5C illustrates an example concurrent or hybrid usage of NP CSI-RS and BF CSI-RS with two CSI processes and two NZP CSI-RS resources according to an embodiment of the present disclosure.

FIG. 5C illustrates an example concurrent or hybrid usage of NP CSI-RS and BF CSI-RS with two CSI processes and two NZP CSI-RS resources according to an embodiment of the present disclosure. The embodiment of the concurrent or hybrid usage shown in FIG. 5C is for illustration only. Other embodiments of the concurrent or hybrid usage could be used without departing from the scope of the present disclosure Based on the aforementioned CSI process and NZP CSI-RS resource configuration mechanism, NP CSI-RS and BF CSI-RS can be used concurrently according to an example procedure described in embodiment 560 of FIG. 5C:

- A first CSI process 561 designated for NP CSI-RS is used to configure csi-RS-ConfigNZPId-r13 with a number of ports and a 2D CSI-RS/antenna port (or, in another example, a 2D codebook) pattern, along with its associated resource and subframe configurations. This sets up a first NZP CSI-RS resource 563. This configuration dictates the reporting rate and location (in terms of subframe indices) of NP CSI-RS transmission (565) on PDSCH 570. In another example, this NP CSI-RS transmission can be performed aperiodically via DL control channel.
- A second CSI process 562 designated for UE-specific BF CSI-RS is used to configure csi-RS-ConfigNZPId-r13 with a number of ports and a 2D antenna port pattern, along with its associated resource and subframe configurations. This sets up a second NZP CSI-RS resource 564. This configuration dictates the reporting rate and location (in terms of subframe indices) of BF CSI-RS transmission (566) on PDSCH 570. The rate at which BF CSI-RS is transmitted can be higher than (for example, a multiple of) the rate at which NP CSI-RS is transmitted. In another example, this BF CSI-RS transmission can be performed aperiodically via a DL control channel.

For each of the two CSI processes, a corresponding set of CSI reporting modes (both periodic and aperiodic) is configured for a UE. Upon receiving and measuring a NZP CSI-RS resource, the UE reports CSI based on the reporting configuration and the type of CSI-RS. In this embodiment, CSI reporting mode for one CSI process can be configured independently (therefore differently) from that for the other. For periodic CSI reporting on PUCCH, CSI reporting rate and subframe shift can be configured independently as well. Two options exist for a UE to report a CSI upon measuring a NP CSI-RS. In a first option, the UE reports a complete set of CSI parameters (that is, CQI, RI, and PMI). In a second option, the UE reports only a partial set of CSI parameters. One example is to report only a CSI parameter pertinent to long-term DL channel statistics such as PMIs associated with the first-stage precoder $(i_{1,H}, i_{1,V})$ or $(i_{1,1}, i_{1,2})$ or simply $i_1$.

The number of ports for BF CSI-RS is configured as a part of CSI-RS resource configuration in csi-RS-ConfigNZPId-r13. Therefore, the number of ports is configured semi-statically by default. Although a semi-static configuration is already available in csi-RS-ConfigNZPId-r13, a dynamic configuration (reconfiguration) capability can also be added via DL control signaling. For instance, the number of BF CSI-RS ports a UE measures, along with an indicator associated with the 2D antenna port pattern, can be included in DL assignment. In this case, the value of each of these two indicators (DCI fields) is upper-bounded by its counterpart within its CSI-RS resource configuration. That is, $N_{PORT,BF-D} \leq N_{PORT,BF}$, $M_{BF-D} \leq M_{BF}$, or $N_{BF-D} \leq N_{BF}$ where subscript D signifies dynamic.

In the present disclosure, several other embodiments for the CSI process configuration mechanism are described below.

In another embodiment, at least one of the two NZP CSI-RS resources (for example, associated with NP CSI-RS and BF CSI-RS) can be composed of a plurality of smaller NZP CSI-RS resources. This embodiment can be an extension of either embodiment 2 or 3. For example, each of the plurality of smaller NZP CSI-RS resources can be a Rel. 12 NZP CSI-RS resource which supports up to 8 ports. This embodiment can be used to construct a new NZP CSI-RS resource which supports a larger number of ports (such as 12 or 16). All these smaller resources can be combined into one single resource. In another example, different smaller resources can be transmitted in different subframes (also known as partial-port CSI-RS or subsampled CSI-RS). In another example, each of these resources can be associated with a beam (which includes a set of ports) to support a form of vertical or virtual sectorization. In this case, a serving eNB can transmit multiple smaller CSI-RS resources to a UE. The UE measures all these smaller resources and reports a recommended beam selection along with its associated CSI reporting.

Figure 6A:
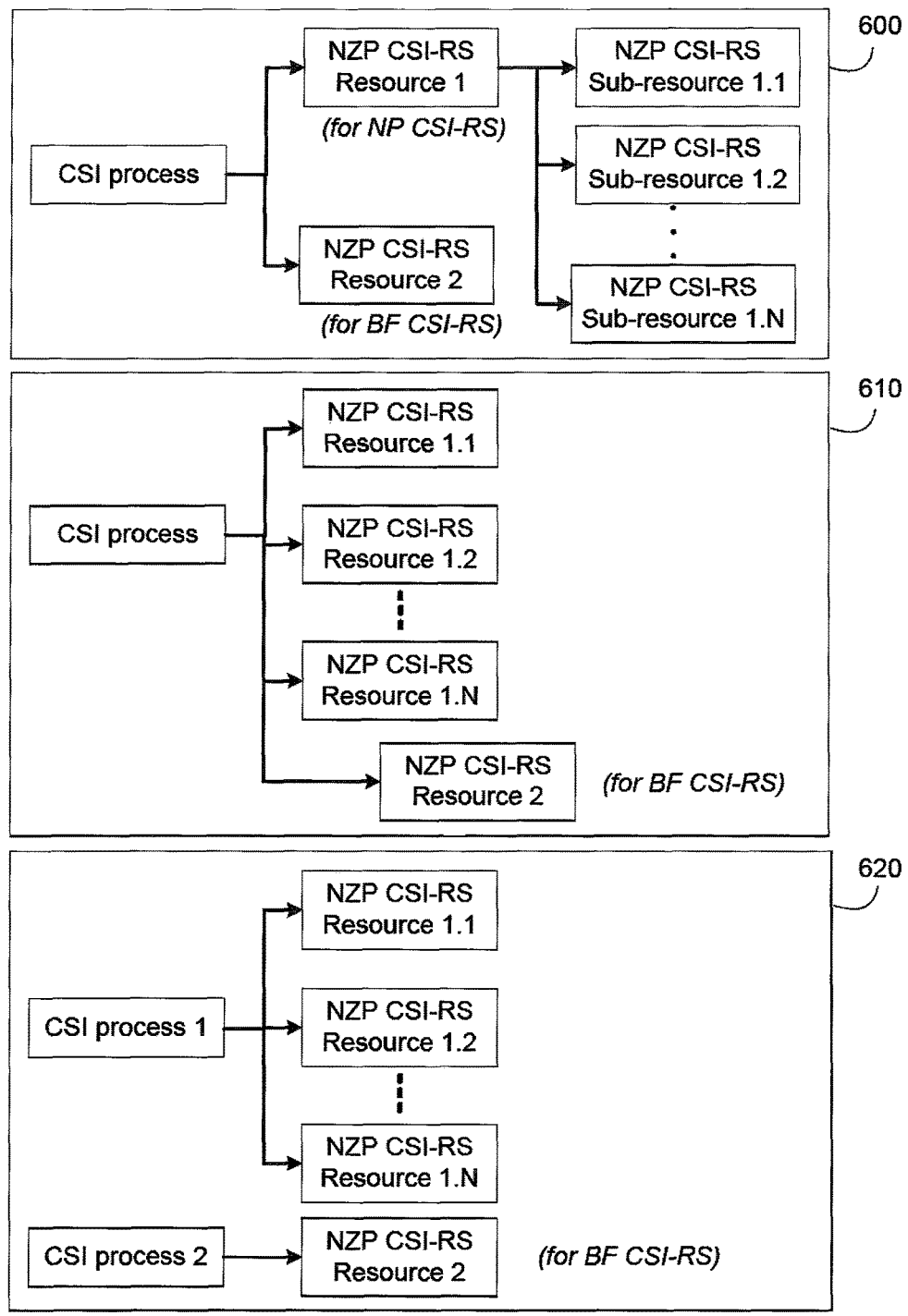
FIG. 6A illustrates example CSI process configurations wherein at least one CSI process is configured with a plurality of NZP CSI-RS resources according to an embodiment of the present disclosure.

This is illustrated by example CSI reporting configuration 600 of FIG. 6A. FIG. 6A illustrates example CSI process configurations wherein at least one CSI process is configured with a plurality of NZP CSI-RS resources according to an embodiment of the present disclosure. The embodiment of the example CSI process configurations shown in FIG. 6A is for illustration only. Other embodiments of the example CSI process configurations could be used without departing from the scope of the present disclosure.

In this illustrative embodiment, the N smaller NZP CSI-RS resources are termed the N CSI-RS sub-resources which compose a first (larger) NZP CSI-RS resource 1. In this example scheme, this first resource is used for NP CSI-RS. A second NZP CSI-RS resource 2 is defined separately for BF CSI-RS.

In yet another embodiment, more than two NZP CSI-RS resources are utilized in one CSI process. This embodiment can be perceived as an extension of embodiment 2. Any of these N NZP CSI-RS resources can be a smaller resource or a larger NZP CSI-RS resource. All these first N resources (1.1, 1.2, . . . , 1.N) can be transmitted in different subframes (also known as partial-port CSI-RS or subsampled CSI-RS). In another example, each of these resources can be associated with a beam (which includes a set of ports) to support a form of vertical/virtual sectorization. In this case, a serving eNB can transmit multiple CSI-RS resources to a UE. The UE measures all these resources and reports a recommended beam selection along with its associated CSI reporting. This is illustrated in example CSI reporting configuration 610 of FIG. 6A where the first N smaller NZP CSI-RS resources are termed the N CSI-RS resources 1.1, 1.2, . . . , 1.N. Another NZP CSI-RS resource 2 is defined separately for BF CSI-RS. A variation of this embodiment allows the number of NZP CSI-RS resources to be varied depending on the need. TABLE 18 illustrates an example CSI process configuration for this embodiment. Each of these CSI-RS resource configurations is defined similarly to that of embodiment 3 (for instance, TABLE 14, 15, 16, or 17).

TABLE 18

NZP CSI-RS resource configuration for the above-discussed embodiment 2
CSI-RS-ConfigNZP information elements

```
-- ASN1START
CSI-Process-r13 ::=         SEQUENCE {
    csi-ProcessId-r13           CSI-ProcessId-r13,
    numCSI-RS-ConfigNZP-r13     INTEGER (1..N),
    csi-IM-ConfigId-r13         CSI-IM-ConfigId-r13,
    p-C-AndCBSRList-r13         SEQUENCE (SIZE (1..2)) OF P-C-AndCBSR-r13,
    cqi-ReportBothProc-r13   CQI-ReportBothProc-r13        OPTIONAL,       -- Need OR
    cqi-ReportPeriodicProcId-r13 INTEGER (0..maxCQI-ProcExt-r13)      OPTIONAL,       --
Need OR
    cqi-ReportAperiodicProc-r13 CQI-ReportAperiodicProc-r13          OPTIONAL,       -- Need
OR
    ...,
    ...
}
-- ASN1STOP
```

In a still yet another embodiment, at least two NZP CSI-RS resources are utilized in one of the two CSI processes. This embodiment can be an extension of the above-discussed embodiment 3. In a first CSI process, a plurality of (N) NZP CSI-RS resources (1.1, 1.2, ..., 1.N) are utilized. All these first N resources (1.1, 1.2, ..., 1.N) can be transmitted in different subframes (also known as partial-port CSI-RS or subsampled CSI-RS). In another example, each of these resources can be associated with a beam (which includes a set of ports) to support a form of vertical/virtual sectorization. In this case, a serving eNB can transmit multiple CSI-RS resources to a UE. The UE measures all these resources and reports a recommended beam selection along with its associated CSI reporting. This can be described in example CSI reporting configuration 620 of FIG. 6A where the first N NZP CSI-RS resources associated with a first CSI process (1) are termed the N CSI-RS resources 1.1, 1.2, ..., 1.N. A second CSI process (2) is defined separately for BF CSI-RS and associated with one NZP CSI-RS resource.

In each of the above-discussed embodiments, the second NZP CSI-RS resource associated with the second CSI process can be composed of or aggregated from multiple smaller NZP CSI-RS resources. In another example, in a yet still another embodiment, the second CSI process utilizes either one or multiple (K>1) NZP CSI-RS resources. When only one NZP CSI-RS resource is utilized for the second CSI process, this embodiment is equivalent to the third above-discussed embodiment. In this case, at least one PMI value associated with beam selection (when applicable) and co-phasing across two polarization groups (along with its associated CQI and PMI) is reported. Here, a beam is defined as a group of two antenna ports associated with two polarization groups. The number of antenna ports associated with this NZP CSI-RS resource is a multiple of two.

Figure 6B:
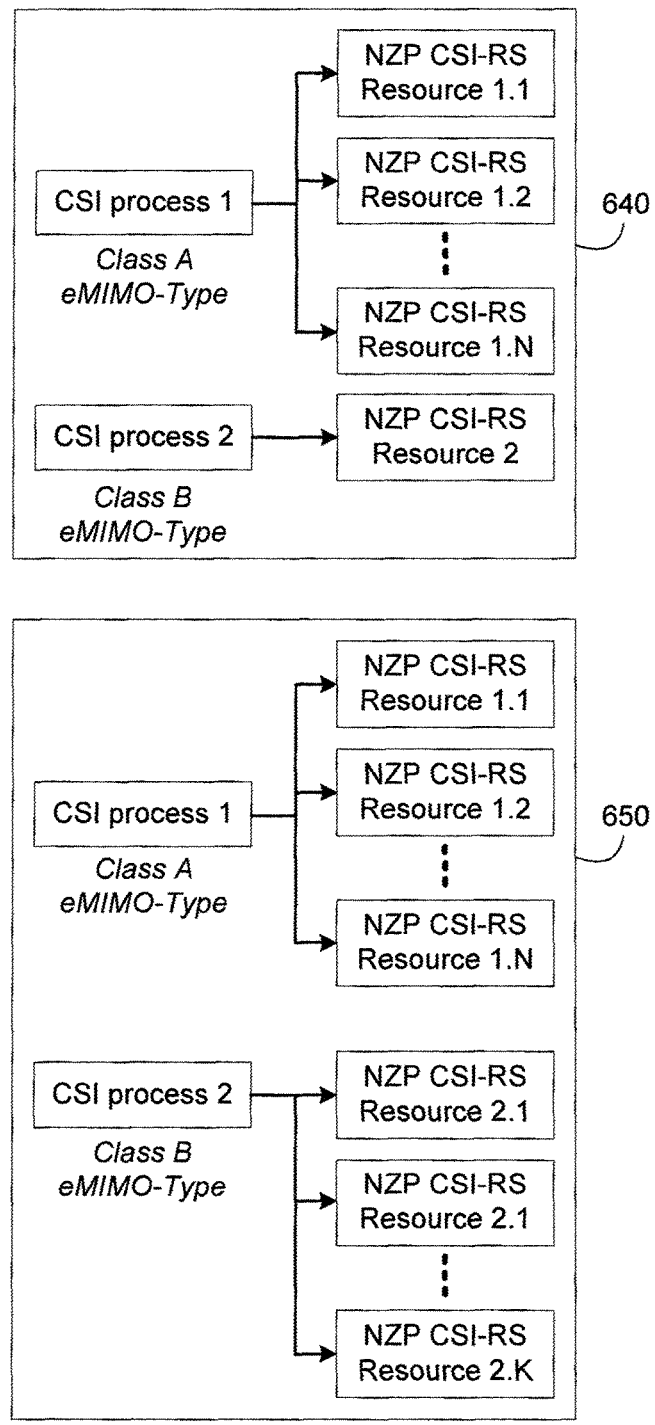
FIG. 6B illustrates example CSI process configurations wherein at least one of the two CSI processes is configured with a plurality of NZP CSI-RS resources and CLASS A eMIMO-Type according to an embodiment of the present disclosure.

This is exemplified in example CSI reporting configuration 640 of FIG. 6B. FIG. 6B illustrates example CSI process configurations wherein at least one of the two CSI processes is configured with a plurality of NZP CSI-RS resources and CLASS A eMIMO-Type according to an embodiment of the present disclosure. The embodiment of the example CSI process configurations shown in FIG. 6B are for illustration only. Other embodiments of the example CSI process configurations could be used without departing from the scope of the present disclosure.

When multiple (K>1) NZP CSI-RS resources are utilized for this embodiment, each of the K beams or virtual sectors can be associated with one NZP CSI-RS resource while all the beams (and hence all the CSI-RS resources) are associated with one CSI process. In this embodiment, a beam is defined as a collection of NP CSI-RS antenna ports. A serving eNB can apply beam-specific precoding or beam-forming across all the ports within each beam or virtual sector. This precoding or beamforming is transparent to any served UE. In this embodiment, a UE measures each of the beams (or virtual sectors), calculates, and reports CSI for each beam (and hence each NZP CSI-RS resource). In addition, the UE reports a beam or CSI-RS resource selection index which informs the eNB of a recommended beam selection. This is exemplified in example CSI reporting configuration 650 of FIG. 6B. Therefore, different CSI reporting behavior holds for different number of NZP CSI-RS resources in the second CSI process. That is, when only one NZP CSI-RS resource is used, at least one PMI value associated with beam selection (when applicable) and co-phasing across two polarization groups (along with its associated CQI and PMI) is reported. When K>1 NZP CSI-RS resources are used, a beam or CSI-RS resource selection index and a CQI/PMI/RI associated with the recommended beam are reported.

In each of the above-discussed embodiments, the first and the second CSI process can be differentiated by means of a type or a class such as a CSI-RS type (for instance, 'NP' or 'BF' type) or a CSI reporting class or a MIMO type or eMIMO-Type (for instance, class A or class B).

Yet another embodiment of hybrid CSI-RS can be designed for supporting larger numbers of ports using multiple CSI-RS resources. Instead of defining one NZP CSI-RS resource for NP CSI-RS, one CSI-RS measurement resource (CMR) which is composed of at least one NZP CSI-RS resource (for instance, each with a maximum of 8 ports) can be used. A plurality of NZP CSI-RS resources are utilized to construct one CMR when the number of NP CSI-RS ports is larger than 8. In this case, the three sub-embodiments can be described as follows. In sub-embodiment 1, hybrid CSI-RS with 2 CSI processes, 1 NZP CSI-RS resource (or 1 CMR composed of 1 NZP CSI-RS) for a CSI process associated with BF CSI-RS, 1 CMR for the other CSI process associated with NP CSI-RS. In sub-embodiment 2, hybrid CSI-RS with 1 CSI process including 1 NZP CSI-RS resource (or 1 CMR composed of 1 NZP CSI-RS) associated with BF CSI-RS and 1 CMR associated with NP CSI-RS. In sub-embodiment 3, hybrid CSI-RS with 1 CSI process and 1 CMR associated with both NP CSI-RS and BF CSI-RS.

Yet another embodiment of hybrid CSI-RS can be designed for supporting larger numbers of ports using multiple CSI-RS resources. Since a full-port design of NP CSI-RS which transmits NP CSI-RS along all the available CSI-RS ports becomes increasingly infeasible, a partial-port design of NP CSI-RS where subsampling is performed either in time-frequency domain, in spatial (port) domain, or both, can be used for reducing DL RS overhead. In this case, different subsets of NP CSI-RS ports are transmitted in different subframes and/or RBs. This partial-port NP CSI-RS can be used in conjunction with BF CSI-RS, resulting in another embodiment of hybrid CSI-RS. For this method, reporting either quantized channels or channel eigenvector(s) (termed the explicit feedback in the present disclosure) measured from partial-port NP CSI-RS. Therefore, a serving eNB can choose to transmit a size-$N_{PART\text{-}PORT}$ subset of $N_{PORT}$ available antenna ports ($N_{PART\text{-}PORT} \leq N_{PORT}$) to a UE and the UE measures $N_{PART\text{-}PORT}$ antenna ports. Then the UE quantizes the measured channel and feeds back the quantization information to the eNB. The eNB can then perform time-frequency and/or spatial interpolation to recover the full DL MIMO channel. This explicit feedback can be either quantized DL short-term channel coefficients (or eigenvector(s) or singular vector(s) of a MIMO channel) or DL long-term channel statistics (for example, channel covariance matrix).

Figure 7A:
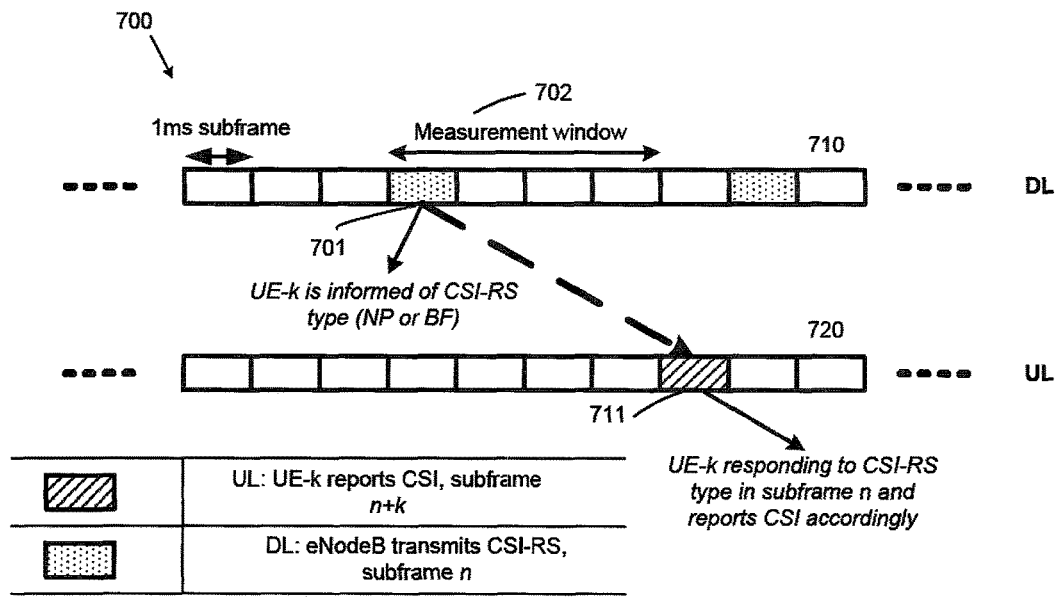
FIG. 7A illustrates an example UE procedure wherein a UE responds to CSI-RS type information in subframe n by reporting a corresponding CSI in a later subframe according to an embodiment of the present disclosure.

A third component for enabling a CSI reporting mechanism which flexibly accommodates both NP and BF CSI-RS is the content of CSI reporting for each type of CSI-RS along with its corresponding CSI measurement and reporting procedures. FIG. 7A illustrates an example UE procedure 700 wherein a UE responds to CSI-RS type information in subframe n by reporting a corresponding CSI in a later subframe according to an embodiment of the present disclosure. The embodiment of the example UE procedure 700 shown in FIG. 7A is for illustration only. Other embodiments of the example UE procedure 700 could be used without departing from the scope of the present disclosure.

FIG. 7A illustrates an example UE procedure 700 for CSI measurement and reporting in the form of a timing diagram which involves both DL 710) and UL (720) transmissions. In the procedure 700, a UE (e.g., UE 116) is configured with a NZP CSI-RS resource along with a CSI reporting mode (as well as any other related configurations pertaining to CSI reporting). The UE is informed of the type of CSI-RS (NP or BF or both) for a given subframe either via semi-static signaling (for example, as a part of NZP CSI-RS resource configuration) or dynamic signaling (for example, via DL control signaling). This information is available for the UE in subframe n (701). Within a measurement window 702, the UE performs CSI measurement and calculation. Responding to the CSI-RS type acquired in subframe n (as well as CSI reporting mode configuration), the UE reports a CSI in subframe n+k (711). As previously discussed, the type of CSI-RS can also be inferred implicitly from another indicator (for example, higher layer configuration as a part of CSI process configuration) such as the type of CSI reporting or a MIMO type or eMIMO-Type.

For instance, when the type of CSI-RS is inferred to be NP, a CSI report contains PMI values associated with a first stage and a second stage precoding. When the type of CSI-RS is inferred to be BF, a CSI report contains at least one PMI value associated with only the second stage precoding. For example, if $\{i_{1,1}, i_{1,2}, i_{2,1}, i_{2,2}\}$ are the PMI values associated with $\{W_{1,V}, W_{1,H}, W_{2,V}, W_{2,H}\}$ or $\{W_{1,1}, W_{1,2}, W_{2,1}, W_{2,2}\}$, when the type of CSI-RS is inferred to be NP, a CSI report contains PMI values pertaining to $\{i_{1,1}, i_{1,2}, i_{2,1}, i_{2,2}\}$. But when the type of CSI-RS is inferred to be BF, a CSI report contains at least one PMI value pertaining to $\{i_{2,1}, i_{2,2}\}$. Likewise, if $\{i_{1,1}, i_{1,2}, i_2\}$ are the PMI values associated with $\{W_{1,V}, W_{1,H}, W_2\}$ or $\{W_{1,1}, W_{1,2}, W_2\}$, when the type of CSI-RS is inferred to be NP, a CSI report contains PMI values pertaining to $\{i_{1,1}, i_{1,2}, i_2\}$. But when the type of CSI-RS is inferred to be BF, a CSI report contains at least one PMI value pertaining to $\{i_2\}$.

To multiplex NP CSI-RS and BF CSI-RS for implementing hybrid CSI-RS, NP CSI-RS can be transmitted at a lower rate compared to UE-specific BF CSI-RS. To ensure that a UE knows whether a CSI-RS-bearing subframe contains NP CSI-RS or BF CSI-RS, an indicator is signaled to the UE, either semi-statically (via higher layer signaling which, for instance, can be a part of NZP CSI-RS resource configuration or CSI process configuration) or dynamically (conveyed via a DL control channel).

For multiplexing the transmission of NP CSI-RS and BF CSI-RS as well as CSI reporting associated with NP CSI-RS and BF CSI-RS, at least two embodiments can be used. A first embodiment includes periodic transmission of both NP CSI-RS and UE-specific BF CSI-RS. In this embodiment, a first BF CSI-RS is transmitted with periodicity T1 (ms) and a second NP CSI-RS is transmitted with periodicity T2 (ms), where T1≤T2. For instance T2 can be made an integer (1, 2, 3, . . . ) multiple of T1. Here, the lower-rate NP CSI-RS is transmitted so that a UE is able to measure non-precoded DL channel and report a CSI associated with it.

Figure 7B:
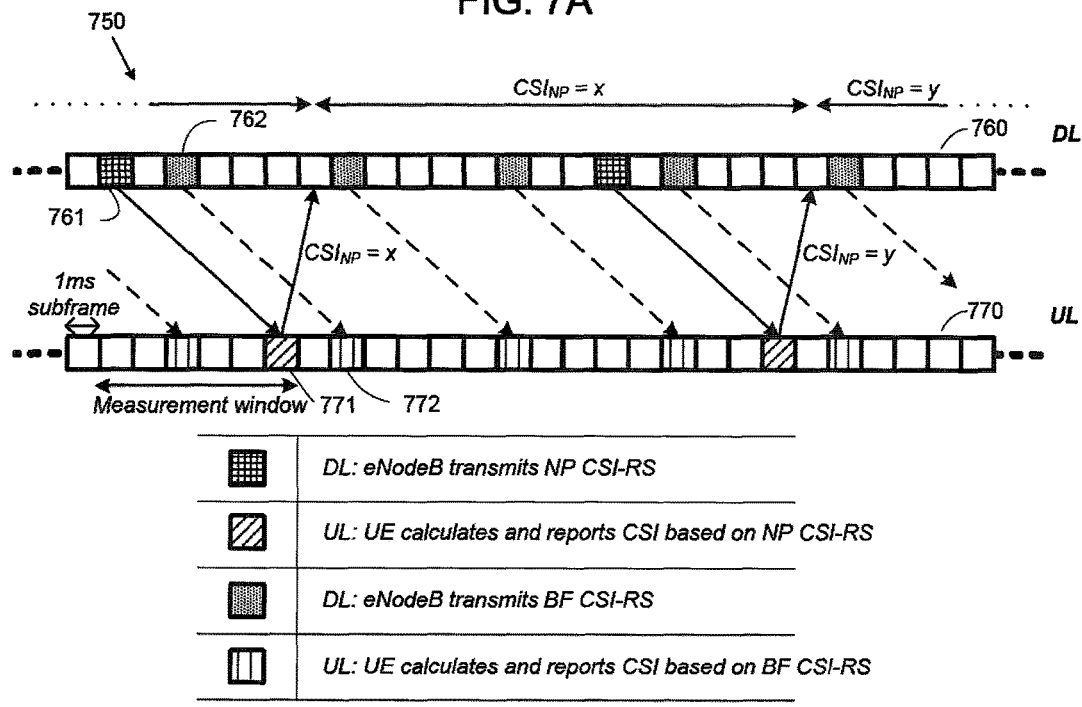
FIG. 7B illustrates an example concurrent or hybrid usage of NP CSI-RS and BF CSI-RS wherein a CSI report associated with NP CSI-RS is utilized by the eNB for configuring BF CSI-RS according to an embodiment of the present disclosure.

FIG. 7B illustrates an example concurrent or hybrid usage of NP CSI-RS and BF CSI-RS wherein a CSI report associated with NP CSI-RS is utilized by the eNB for configuring BF CSI-RS according to an embodiment of the present disclosure; The embodiment shown in FIG. 7B is for illustration only. Other embodiments could be used without departing from the scope of the present disclosure.

In this example implementation of the first embodiment, a DL-UL timing diagram 750, including DL transmission 760 and UL transmission 770, is used for illustrative purposes. A NP CSI-RS is transmitted in subframes 761 (which are configured to transmit NP CSI-RS). Upon receiving a subframe of 761 from a serving eNB (e.g., eNB 102), a UE measures a respective DL channel within an allowable measurement window. Then the UE responds by measuring CSI corresponding to NP CSI-RS and feeding the measured CSI back to the eNB in subframe 771. This CSI includes at least a CSI parameter which can be used by the eNB to derive a precoder for forming BF CSI-RS for that particular UE (derived from a non-precoded channel measurement). Having received and decoded the feedback, the eNB utilizes the feedback to perform beamforming on CSI-RS transmitted in subframes 762 (hence the BF CSI-RS). Upon receiving such a subframe from a serving eNB, a UE measures a CSI and responds by feeding back CSI parameters in subframes 772 (derived from a partially precoded/beamformed channel measurement).

A second embodiment includes aperiodic transmission of NP CSI-RS while UE-specific BF CSI-RS can be transmitted either periodically or aperiodically. In this embodiment, a NP CSI-RS is transmitted in a subframe containing either an UL grant which requests a UE to report aperiodic CSI or a DL assignment. Transmitting a NP CSI-RS together with a CSI triggering UL grant associates the requested aperiodic CSI reporting with the companion NP CSI-RS. The scheme exemplified in FIG. 7B, where NP CSI-RS can be transmitted periodically or aperiodically, can be used in conjunction with either periodic or aperiodic CSI reporting. Regardless whether the UE reports a periodic or an aperiodic CSI, the UE derives and reports CSI depending on the most recent CSI-RS type received and measured by the UE. For example, if the most recent CSI-RS is non-precoded, the UE reports CSI parameters associated with the $N_{PORT}$ ports. If the most recent CSI-RS is beamformed, the UE reports CSI parameters associated with the $N_{PORT,BF}$ ports. Therefore, the UE is responsive to the type of CSI-RS that is most recently received and measured.

The content of a CSI report can be made dependent on the type of CSI-RS (which can be associated with, for example, a MIMO type of 'CLASS A'/'nonPrecoded' and 'CLASS B'/'beamformed') as previously mentioned. This is particularly the case with PMIs. Another CSI parameter is a recommended number of UE-specific BF CSI-RS ports $N_{PORT,BF}$ which can be related to the number of beam directions (or beams) associated with the first-stage precoders $W_{1,V}$ and $W_{1,H}$ (or $W_{1,1}$ and $W_{1,2}$). Denoting the number of beams per polarization as $N_B$, the total number of BF CSI-RS ports generated from a precoding matrix of this sort is $N_{PORT,BF}=2\times N_B$. Regardless whether $N_{PORT,BF}$ is related to $N_B$, a recommended value of $N_{PORT,BF}$ can be reported by a UE to a serving eNB. To determine a recommended value of $N_{PORT,BF}$, a UE can measure an uncompressed channel from NP CSI-RS. This is enabled when both NP CSI-RS and BF CSI-RS are configured for the UE.

TABLE 19, 20, 21, and 22 describe four example embodiments of the content of CSI report in response to receiving a CSI-RS type when a UE is configured with hybrid CSI-RS. In all these four examples, the UE reports a same set of CSI parameters where PMI associated with second-stage precoder ($\{i_{2,V}, i_{2,H}\}$ or $\{i_{2,1}, i_{2,2}\}$ or $\{i_2\}$) is reported without that associated with first-stage precoder ($\{i_{1,V}, i_{1,H}\}$ or $\{i_{1,1}, i_{1,2}\}$). In all these four examples, CQI or PMI can wideband or subband (except for wideband PMI associated with first-stage precoder $\{i_{1,V}, i_{1,H}\}$ or $\{i_{1,1}, i_{1,2}\}$) depending on the CSI reporting mode.

TABLE 19 and 20 describe a streamlined CSI reporting mechanism when the UE receives NP CSI-RS. Since a main purpose of NP CSI-RS is to report a recommended PMI which is associated with long-term channel statistics (used for forming BF CSI-RS), only $\{i_{1,V}, i_{1,H}\}$ (or $\{i_{1,1}, i_{1,2}\}$) PMI is reported. In addition, a recommended number of BF CSI-RS ports $N_{PORT,BF}$ can be reported (TABLE 20). Embodiments in TABLE 19 and 20 require at least one new CSI reporting type which reports $\{i_{1,V}, i_{1,H}\}$ (or $\{i_{1,1}, i_{1,2}\}$) only. In another example, the UE can report a complete set of CSI parameters as described in TABLE 21 and 22. In addition to $\{i_{1,V}, i_{1,H}\}/\{i_{1,1}, i_{1,2}\}$ (and $N_{PORT,BF}$), $\{i_{2,V}, i_{2,H}\}/\{i_{2,1}, i_{2,2}\}$ or $\{i_2\}$ as well as CQI and RI are reported. TABLE 23 and 24 describe variations of TABLE 19 and 20, respectively, where RI is also reported as a part of CSI associated with NP CSI-RS.

TABLE 19

CSI parameters to be reported as a response to CSI-RS type

| | CSI parameters to be reported as a response of CSI-RS type | |
|---|---|---|
| | NP CSI-RS | BF CSI-RS |
| PMI | $\{i_{1,V}, i_{1,H}\}/\{i_{1,1}, i_{1,2}\}$ | $\{i_{2,V}, i_{2,H}\}/\{i_{2,1}, i_{2,2}\}$ or $\{i_2\}$ |
| RI | — | RI |
| CQI | — | CQI |
| Other | — | — |

TABLE 20

CSI parameters to be reported as a response to CSI-RS type

| | CSI parameters to be reported as a response of CSI-RS type | |
|---|---|---|
| | NP CSI-RS | BF CSI-RS |
| PMI | $\{i_{1,V}, i_{1,H}\}/\{i_{1,1}, i_{1,2}\}$ | $\{i_{2,V}, i_{2,H}\}/\{i_{2,1}, i_{2,2}\}$ or $\{i_2\}$ |
| RI | — | RI |
| CQI | — | CQI |
| Other | $N_{PORT,BF}$ | — |

TABLE 21

CSI parameters to be reported as a response to CSI-RS type

| | CSI parameters to be reported as a response of CSI-RS type | |
|---|---|---|
| | NP CSI-RS | BF CSI-RS |
| PMI | $\{i_{1,V}, i_{1,H}, i_{2,V}, i_{2,H}\}/$ $\{i_{1,1}, i_{1,2}, i_{2,1}, i_{2,2}\}$ or $\{i_{1,V}, i_{1,H}, i_2\}/\{i_{1,1}, i_{1,2}, i_2\}$ | $\{i_{2,V}, i_{2,H}\}/\{i_{2,1}, i_{2,2}\}$ or $\{i_2\}$ |
| RI | RI | RI |
| CQI | CQI | CQI |
| Other | — | — |

TABLE 22

CSI parameters to be reported as a response to CSI-RS type

| | CSI parameters to be reported as a response of CSI-RS type | |
|---|---|---|
| | NP CSI-RS | BF CSI-RS |
| PMI | $\{i_{1,V}, i_{1,H}, i_{2,V}, i_{2,H}\}/$ $\{i_{1,1}, i_{1,2}, i_{2,1}, i_{2,2}\}$ or $\{i_{1,V}, i_{1,H}, i_2\}/\{i_{1,1}, i_{1,2}, i_2\}$ | $\{i_{2,V}, i_{2,H}\}/\{i_{2,1}, i_{2,2}\}$ or $\{i_2\}$ |
| RI | RI | RI |
| CQI | CQI | CQI |
| Other | $N_{PORT,BF}$ | — |

TABLE 23

CSI parameters to be reported as a response to CSI-RS type

| | CSI parameters to be reported as a response of CSI-RS type | |
|---|---|---|
| | NP CSI-RS | BF CSI-RS |
| PMI | $\{i_{1,V}, i_{1,H}\}/\{i_{1,1}, i_{1,2}\}$ | $\{i_{2,V}, i_{2,H}\}/\{i_{2,1}, i_{2,2}\}$ or $\{i_2\}$ |
| RI | RI | RI |
| CQI | — | CQI |
| Other | — | — |

TABLE 24

CSI parameters to be reported as a response to CSI-RS type

| | CSI parameters to be reported as a response of CSI-RS type | |
|---|---|---|
| | NP CSI-RS | BF CSI-RS |
| PMI | $\{i_{1,V}, i_{1,H}\}/\{i_{1,1}, i_{1,2}\}$ | $\{i_{2,V}, i_{2,H}\}/\{i_{2,1}, i_{2,2}\}$ or $\{i_2\}$ |
| RI | RI | RI |
| CQI | — | CQI |
| Other | $N_{PORT,BF}$ | — |

As the number of NP CSI-RS ports increases, the increase in CSI-RS overhead starts to offset the gain obtained from utilizing a large number of NP CSI-RS ports. This is especially relevant when CSI-RS transmission is performed across all the available NP CSI-RS ports in a given subframe. Therefore, this so-called full-port design becomes infeasible in this scenario. At the same time, transmitting NP CSI-RS on only a subset of ports (termed the "partial-port" design) in a given subframe and/or RB results in significant performance loss since a serving eNB typically fails to estimate the CSI corresponding to a full-port design from several CSIs associated with different subsets of ports. This reconstruction problem happens since CQI is defined as a recommended spectral efficient assuming that the serving eNB transmit to only one UE at a given time. This feedback paradigm is termed often the implicit feedback which is used in the current LTE system. In future systems, other antenna configurations such as 3D cylindrical, lens, or spherical antennas can be used. Since implicit feedback paradigm assumes at least one codebook for PMI feedback (which is typically designed assuming a certain antenna array configuration), the accuracy of CSI is hampered when different antenna geometry is used. Furthermore, a mismatch between single-user (SU) transmission hypothesis for CSI derivation at a UE—in accordance to the current implicit CSI feedback paradigm in LTE—and multi-user (MU) transmission at a serving eNB worsens as the number of antenna ports at the eNB increases.

Therefore, there is a need to design a CSI reporting method, along with its companion CSI-RS construction method, which is not only less dependent on antenna array geometry, but also avoids the dilemma between NP CSI-RS overhead and CSI reporting accuracy. In addition, this method should reduce CSI discrepancy between a UE and its serving eNB when MU-MIMO transmission is performed.

In the present disclosure, a method for improving CSI accuracy for MU-MIMO transmission includes three components which can be used in combination with each other: partial-port CSI-RS mapping, explicit channel feedback for each subset of ports, and concurrent use of NP CSI-RS and UE-specific BF CSI-RS (hybrid CSI-RS). For example, a joint usage of the first component (partial-port CSI-RS mapping) and the second component (explicit channel feedback) entails reporting explicit channel feedback for each of a plurality of subsets of an $N_{TX}$-port NP CSI-RS. A joint usage of the second component (e.g., explicit channel feedback) and the third component (e.g., hybrid CSI-RS) entails reporting explicit channel feedback for an $N_{TX}$-port NP CSI-RS in conjunction with reporting CQI, PMI, and RI associated with UE-specific BF CSI-RS. A joint usage of the first component (e.g., partial-port CSI-RS mapping), the second component (e.g., explicit channel feedback), and the third component (e.g., hybrid CSI-RS) entails reporting explicit channel feedback for each of a plurality of subsets of an $N_{TX}$-port NP CSI-RS in conjunction with reporting CQI, PMI, and RI associated with UE-specific BF CSI-RS. Each of the three components is described as follows.

The first component, partial-port CSI-RS mapping, can be described as follows. A serving eNB transmits NP CSI-RS with partial-port mapping in a subframe configured for NP CSI-RS transmission. In this case, NP CSI-RS is transmitted only on a subset of all the available NP CSI-RS ports within a subframe. To attain full, or at least richer, DL channel information at the serving eNB, the eNB can change the subset from a subframe configured for NP CSI-RS transmission to a next subframe configured for NP CSI-RS transmission. The manner in which the subset is varied from a subframe to a next can be done in at least two schemes. In a first scheme, this subset variation or cycling can follow a configured or a predetermined pattern for transmitting NP CSI-RS across subframes which carry NP CSI-RS (termed the NP CSI-RS subsampling pattern). In a second scheme, the eNB can simply choose a subset of NP CSI-RS ports in a given subframe without following a predetermined pattern. In either of these two schemes, the subset selection of NP CSI-RS ports which a UE is to measure can be UE-specific (for instance, a part of NZP CSI-RS resource configuration which is UE-specific) or cell-specific (same for all RRC_CONNECTED UEs) or group-specific. In this last scheme, all the RRC_CONNECTED_UEs are grouped into multiple groups where each group is configured with a same partial-port subset selection pattern.

For all the above and following embodiments where partial-port NP CSI-RS is transmitted (where subsets of $N_{TX}$-port CSI-RS is transmitted), a UE can be configured with CLASS A eMIMO-Type with one NZP CSI-RS resource of $N_{TX}$ ports. In another example, the UE can be configured with CLASS B eMIMO-Type with multiple ($M_{SUB}$) NZP CSI-RS resources, where each resource is of $N_i$ ports. In another example, a new eMIMO-Type designation can be used.

In the first scheme where a partial-port subset selection pattern is used, the pattern can be described as follows. For a pattern periodicity of $M_{SUB}$ (which is the same as the number of partial-port subsets) and a given set of $M_{SUB}$ subframes carrying partial-port NP CSI-RS $\{n_k, n_{k+1}, \ldots, n_{k+M_{SUB}-1}\}$, each of the subframes $n_i$ is configured to carry and transmit a $N_i$-port subset of NP CSI-RS associated with a size-$N_{SUB,i}$ set of NP CSI-RS ports $\Sigma_i$. Several possible embodiments exist.

A first embodiment entails choosing all the subsets $\{\Sigma_k, \Sigma_{k+1}, \ldots, \Sigma_{k+M_{SUB}-1}\}$ in such a way that $|U_{i=0}^{M_{SUB}-1} \Sigma_i|=N_{TX}$ ($|\Sigma|$ denoting the number of distinct elements in set $\Sigma$, and $|\Sigma_i|=N_i$). In this case, it is possible for either an eNB or a UE to combine CSI measurements associated with all these subsets and derive a full-port CSI measurement. This assumes the use of a second component below (explicit feedback). In this first embodiment, a UE is configured to measure either $M_{SUB}$ subsets of $N_{TX}$-port NZP CSI-RS resource or $M_{SUB}$ NZP CSI-RS resources (associated with $M_{SUB}$ NZP CSI-RS resource configuration), where the i-th subset or i-th resource contains $N_i$ ports. For this i-th measured subset or resource, the UE reports a CSI.

A second embodiment entails choosing all the subsets $\{\Sigma_k, \Sigma_{k+1}, \ldots, \Sigma_{k+M_{SUB}-1}\}$ in such a way that $|U_{i=0}^{M_{SUB}-1} \Sigma_i|<N_{TX}$. In this case, it is not possible for either an eNB or a UE to combine CSI measurements associated with all these subsets and derive a full-port CSI measurement. Yet a combination of these multiple CSI measurements results in an increase in CSI resolution. Just as the first embodiment, in this second embodiment, a UE is configured to measure either $M_{SUB}$ subsets of $N_{TX}$-port NZP CSI-RS resource or $M_{SUB}$ NZP CSI-RS resources (associated with $M_{SUB}$ NZP CSI-RS resource configuration), where the i-th subset or i-th resource contains $N_i$ ports. For this i-th measured subset or resource, the UE reports a CSI.

An example of this second embodiment is with $M_{SUB}=2$ where each of $\Sigma_0$ and $\Sigma_1$ can be associated with a one-dimensional port pattern and its corresponding channel, or one-dimensional codebook. This can be used, for example, to configure a UE with two sets of ports or two NZP CSI-RS resources, wherein each is associated with one of the two dimensions (either horizontal or vertical). The UE is configured to measure and report CSI associated with each of the two NZP CSI-RS resources. Upon receiving these two CSI reports, the eNB can reconstruct a CSI associated with a two-dimensional port pattern.

In either of these two embodiments, subsets of partial-port NP CSI-RS can be chosen to ensure that there is no overlap between any pair of subsets. That is, $\Sigma_i \cap \Sigma_j = \emptyset$ when $i \neq j$. In another example, overlap can occur as well.

The above example description assumes the use of discrete antenna arrays. When continuous aperture antenna architectures are used, subset partitioning takes place in terms of partitioning an aperture into multiple sub-apertures (partial-apertures).

Figure 8A:
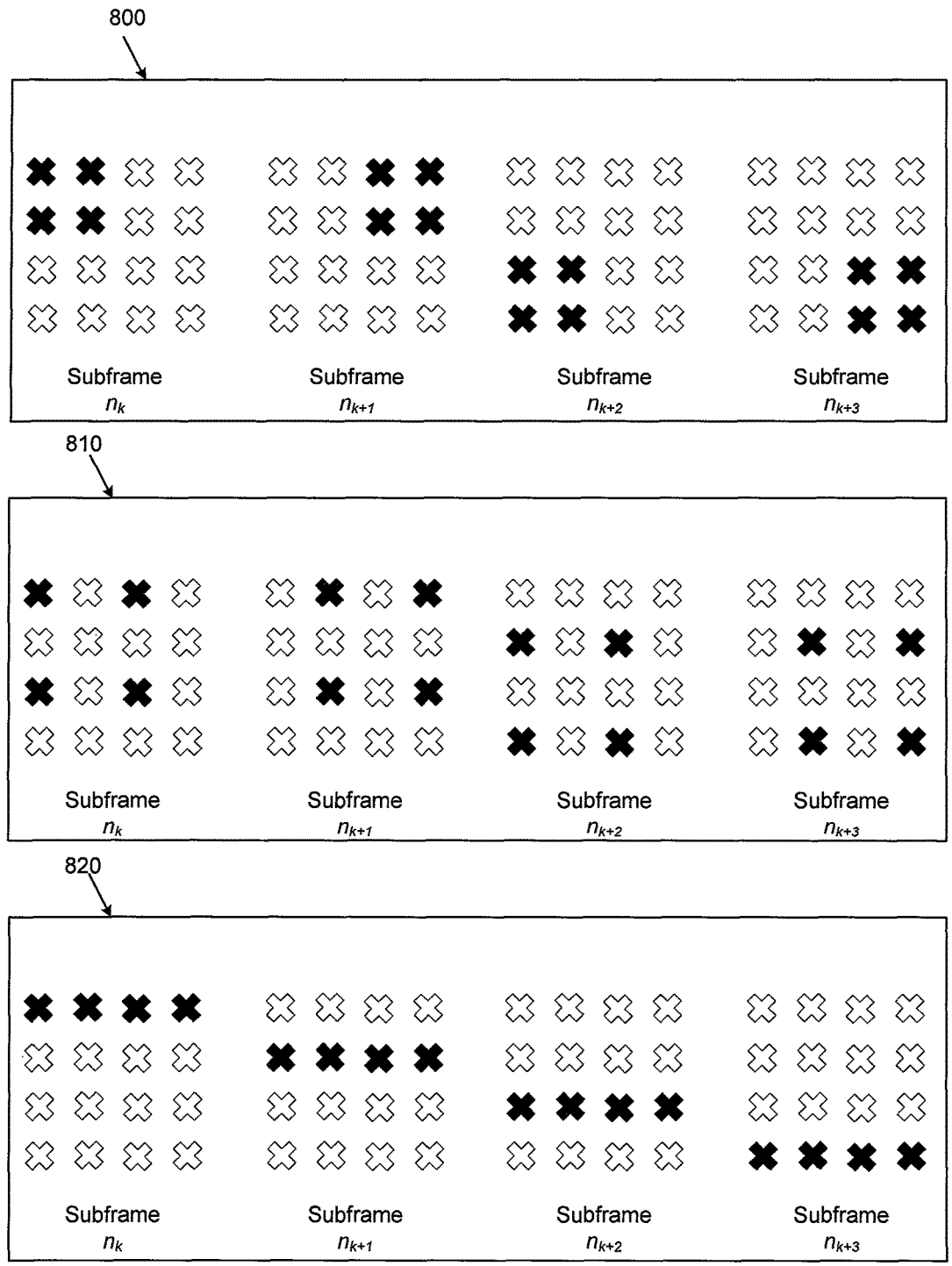
FIG. 8A illustrates example patterns for partial-port CSI-RS mapping with 4 disjoint two-dimensional subsets according to an embodiment of the present disclosure.

FIG. 8A illustrates example patterns for partial-port CSI-RS mapping with 4 disjoint two-dimensional subsets according to an embodiment of the present disclosure. The embodiment of the patterns for partial-port CSI-RS mapping shown in FIG. 8A is for illustration only. Other embodiments of the patterns for partial-port CSI-RS mapping could be used without departing from the scope of the present disclosure.

Some example embodiments of subset selection pattern are described in FIG. 8A. Three example embodiments where $N_{TX}=32$ and $N_i=8$ (which results in $M_{SUB}=4$) are shown. For each of the three example subset selection patterns 800, 810, and 820, four different subsets are utilized and associated with NP-CSI-RS-carrying subframes $\{n_k, n_{k+1}, n_{k+2}, n_{k+3}\}$. In example subset selection pattern 800, a NP CSI-RS subset comprising 4 closely spaced dual-polarized antenna elements is transmitted in a given subframe. In example subset selection pattern 810, a NP CSI-RS subset comprising 4 dual-polarized antenna elements with larger inter-element spacing is transmitted. In example subset selection pattern 820, one row in the rectangular array is transmitted in a given subframe. In these three embodiments, a NP CSI-RS is transmitted on all the available antenna ports in the rectangular array.

Figure 8B:
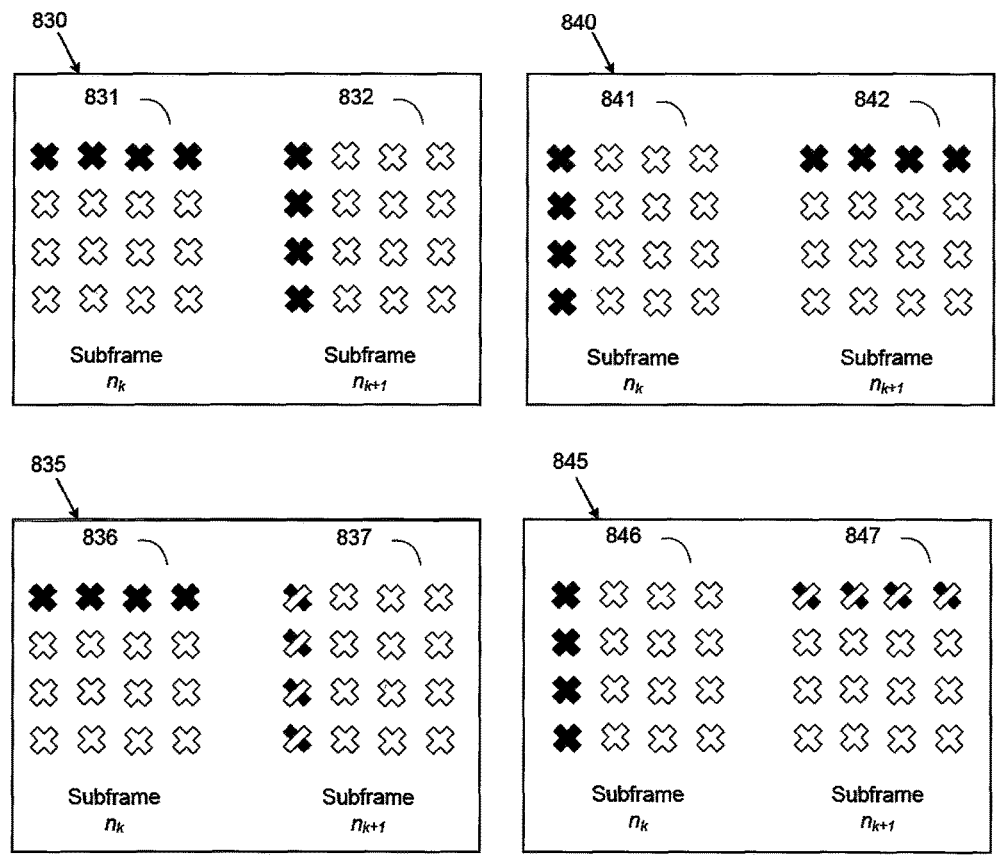
FIG. 8B illustrates example patterns for partial-port CSI-RS mapping with 2 one-dimensional subsets according to an embodiment of the present disclosure.

FIG. 8B illustrates example patterns for partial-port CSI-RS mapping with 2 one-dimensional subsets according to an embodiment of the present disclosure. The embodiment of the patterns for partial-port CSI-RS mapping shown in FIG. 8B is for illustration only. Other embodiments of the patterns for partial-port CSI-RS mapping could be used without departing from the scope of the present disclosure.

Some example embodiments of subset selection pattern with $M_{SUB}=2$ are described in FIG. 8B. Each of the two subsets (hence each of the two NZP CSI-RS resources) can be associated with a one-dimensional port pattern (for example, either horizontal or vertical) and its corresponding channel, or one-dimensional codebook. In embodiment 830, a first subset or CSI-RS resource 831 includes 8 ports with each group of 4 ports is associated with one polarization group. In this example, the first subset can be configured so that the UE can report a CSI for an 8-port horizontal dual-polarized port pattern. A second subset or CSI-RS resource 832 includes 8 ports with each group of 4 ports is associated with one polarization group. In this example, the second subset can be configured so that the UE can report a CSI for an 8-port vertical dual-polarized port pattern. A variation of example subset selection pattern 830 is described in example subset selection pattern 840 where the function and configuration of the first subset 841 and the second subset 842 are swapped from 831 and 832, respectively. In example subset selection pattern 835, a first subset or CSI-RS resource 836 includes 8 ports with each group of 4 ports is associated with one polarization group. In this example, the first subset can be configured so that the UE can report a CSI for an 8-port horizontal dual-polarized port pattern. A second subset or CSI-RS resource 837 includes 4 ports. In this example, the second subset can be configured so that the UE can report a CSI for a 4-port vertical single-polarized port pattern. A variation of example subset selection pattern 835 is described in example subset selection pattern 845 where the function and configuration of the first subset 846 and the second subset 847 are swapped from 836 and 837, respectively.

In each of these four example subset selection patterns, the eNB can estimate a CSI for a two-dimensional dual-polarized port pattern of 4 rows and 4 columns with a total of 32 ports. For example, for example subset selection pattern 835 and 845, a 32-port CSI estimate can be obtained from a Kronecker product between the first CSI (8 ports) and the second CSI (4 ports). For example subset selection patterns 830 and 840, for each of the two polarization groups, a 16-port CSI estimate can be obtained from a Kronecker product between half of the first CSI and half of the second CSI where the half corresponds to a same polarization group.

Figure 8C:
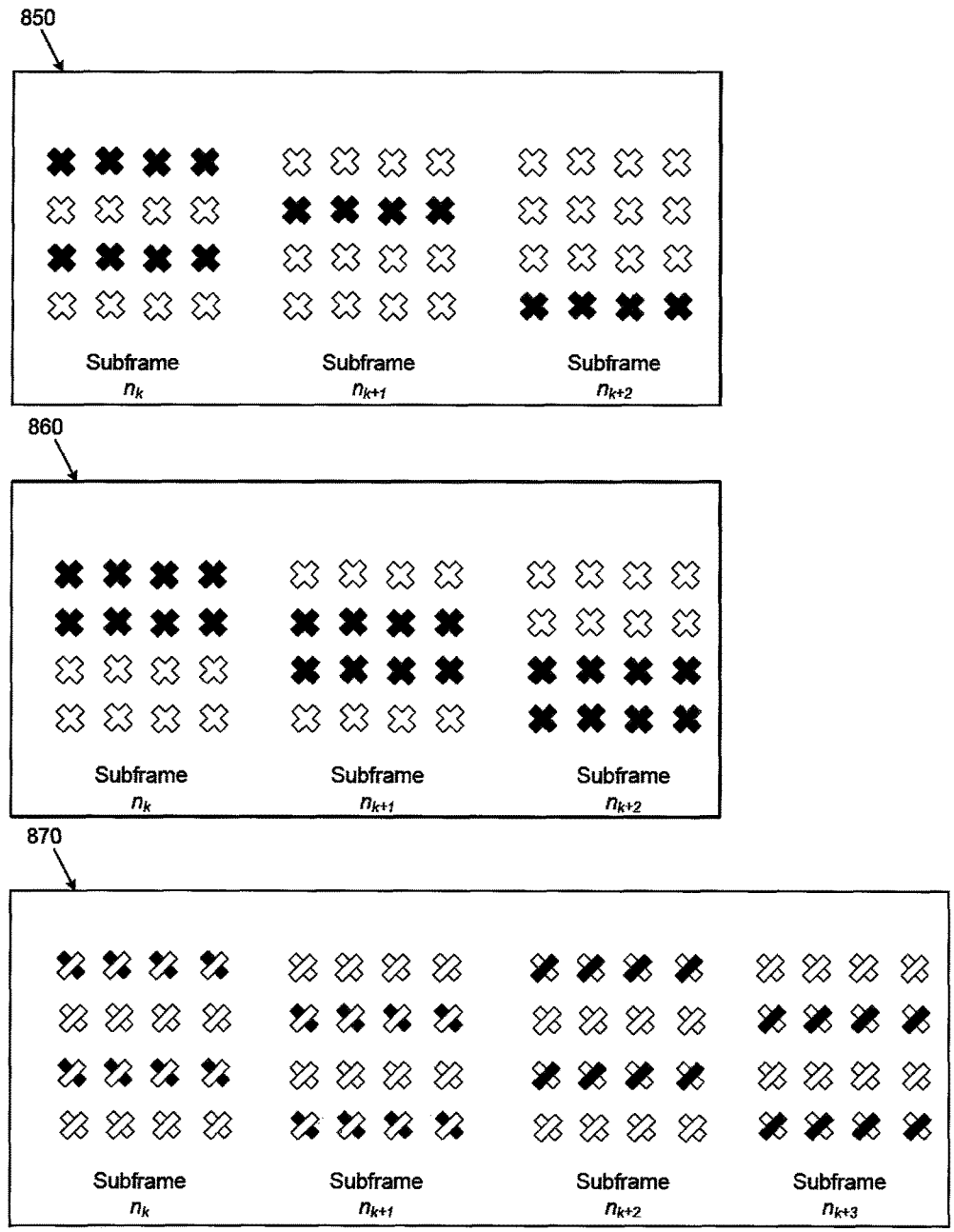
FIG. 8C illustrates example patterns for partial-port CSI-RS mapping with mixed or overlapping subsets according to an embodiment of the present disclosure.

FIG. 8C illustrates example patterns for partial-port CSI-RS mapping with mixed or overlapping subsets according to an embodiment of the present disclosure. The embodiment of the patterns for partial-port CSI-RS mapping shown in FIG. 8C is for illustration only. Other embodiments of the patterns for partial-port CSI-RS mapping could be used without departing from the scope of the present disclosure.

More example embodiments of subset selection pattern are described in FIG. 8C. Three example subset selection patterns where $N_{TX}=32$ are shown. For each of the two example subset selection patterns 850 and 860, three different subsets are utilized and associated with NP-CSI-RS-carrying subframes $\{n_k, n_{k+1}, n_{k+2}\}$ ($M_{SUB}=3$). In example subset selection pattern 850, different subset sizes are used: $N_k=16, N_{k+1}=8, N_{k+2}=8$. In example subset selection pattern 860, the same subset size is used: $N_i=16$. But a one-row overlap between two consecutive subsets occurs. In example subset selection pattern 870, four different subsets are utilized and associated with NP-CSI-RS-carrying subframes $\{n_k, n_{k+1}, n_{k+2}, n_{k+3}\}$ ($M_{SUB}=4$ and $N_i=8$). But NP CSI-RS subsets are transmitted via different polarization groups. In these three embodiments, NP CSI-RS is transmitted on all the available antenna ports in the rectangular array.

The second component, the use of explicit channel feedback for each subset of CSI-RS ports, can be described as follows. For an i-th $N_i$-port subset of the $N_{TX}$-port NP CSI-RS (for instance, associated with one NZP CSI-RS resource), the serving eNB configures a UE to report a CSI which at least includes an explicit channel feedback derived from a measurement of the NZP CSI-RS resource associated with the subset of the $N_{TX}$-port NP CSI-RS. An explicit feedback can entail direct DL channel quantization rather than a recommended precoder of the implicit feedback. Direct DL channel quantization includes quantization of the DL channel (where the number of coefficients/parameters is the number of CSI-RS ports per subset multiplied with the number of receive antenna ports at the UE) obtained from measurement, quantization of at least one eigenvector of the DL channel (where the number of coefficients/parameters is the number of CSI-RS ports per subset for each eigenvector), or quantization of a DL channel covariance matrix (where the number of coefficients/parameters is proportional to the quadratic of the number of CSI-RS ports per subset). The first two channel entities relate to DL short-term channel properties while the third channel entity is a DL long-term channel statistics.

Different quantization schemes such as scalar or vector quantization can be used. For example, a set of basis functions can be used for performing vector quantization. For such basis expansion based quantization, a basis set and a quantizer for each subset of partial-ports are needed. One option is that one common basis set and one common quantizer are utilized for all subsets of partial ports. Another option is utilize a specific basis set and a specific quantizer for each subset of partial-ports.

The above explicit feedback CSI can be reported as a wideband (one report for all the set S subbands) or subband (one report for each set S subband) CSI. The first and second channel entities (direct channel feedback and eigenvector feedback) can be reported as a wideband or subband CSI. The third channel entity (channel covariance) can be reported as a wideband CSI since it is a long-term channel characteristic.

An additional processing prior or after quantization can also be introduced to reduce feedback overhead. This can be applied either across ports or across subbands or both. Examples of overhead reduction mechanism include configurable subband size and frequency-domain subsampling. For frequency-domain subsampling, explicit feedback is reported only for a subset of set S subbands, either configured by the eNB or selected by the UE. When configured by the eNB, the selection of subbands is signaled either semi-statically via higher-layer (RRC) signaling or dynamically via a CSI request (included in an associated UL grant). When configured by the UE, the selection of subbands is reported by the UE as a part of CSI reporting. This selection of subbands can be a bitmap of the size equal to the total number of available subbands (for a given DL system bandwidth) or an indicator of the selection of subbands.

Upon receiving a subframe containing an $N_i$-port subset of the $N_{TX}$-port NP CSI-RS (one NZP CSI-RS resource), a UE measures the DL channel associated with the subset of NP CSI-RS ports. From this channel measurement, the UE performs quantization of the DL channel coefficients or at least one eigenvector of the DL channel or a DL channel covariance matrix as described above. This quantized channel feedback (explicit feedback) can be accompanied with other CSI parameters such as RI and/or CQI and/or at least one PMI calculated under a certain hypothesis. These CSI entities are then reported to the eNB. In another example, the CSI can include only explicit feedback.

Several options are available depending on whether the UE knows which subset of all the available NP CSI-RS ports that the eNB utilizes to transmit NP CSI-RS for a given subframe.

A first option requires no DL signaling of the choice of subset of all the available NP CSI-RS ports (the NP CSI-RS subsampling pattern across subframes which carry NP CSI-RS). In this option, this choice of subset is transparent (unknown) to the UE although the number of ports $N_P=N_i$ (of the i-th NZP CSI-RS resource) is known to the UE. The UE measures $N_P=N_i$ NP CSI-RS ports (partial-ports), performs quantization, and feeds back quantized channel information associated with the $N_P$ ports to the eNB. As the eNB knows the subset of ports associated with each NP CSI-RS subframe, the eNB can combine the quantized channel feedback across different subframes from the UE, potentially providing the eNB full (or at least combined) DL channel information. The number of NP CSI-RS ports $N_P=N_i$ for a given subframe can be made known to the UE by the eNB via at least two embodiments. A first embodiment entails signaling the number of ports dynamically as a part of a downlink control information (DCI), whether an UL grant or a DL assignment or both. A second embodiment entails configuring the number of ports semi-statically via higher-layer (RRC) signaling. This can be done as a part of NZP CSI-RS resource configuration. In either of these two embodiments, the number of partial-ports can be the same or varied across all the subframes carrying NP CSI-RS (cf. FIGS. 8A, 8B, and 8C).

A second option utilizes DL signaling of the choice of subset of all the available NP CSI-RS ports (the NP CSI-RS subsampling pattern across subframes which carry NP CSI-RS). In this option, this choice of subset or the subsampling pattern is signaled to the UE either dynamically or semi-statically. Dynamic signaling can be performed via a DL control channel where an indicator of port subset selection is included as one of the downlink control information (DCI) fields. Semi-static signaling can be performed via higher layer (RRC) signaling where a sequence of port subset selections is configured for the UE. When port subset selection is signaled to the UE, the UE can perform DL channel measurement across multiple subframes and interpolate across those subframes to reconstruct an estimate of full DL channel associated with the $N_{TX}$ NP CSI-RS ports (full-port) which is quantized and reported to the eNB. Upon receiving this feedback from the UE, the eNB utilizes the feedback for link adaptation. In another example, the UE can also opt for a same operation as the first option. In this case, the UE does not attempt to reconstruct an estimate of full DL channel.

A third option which is a variation of the second option is applicable to aperiodic CSI (A-CSI). Here, when a UE receives a CSI request included as a DCI field in an UL grant, a UE reports a CSI associated with an $N_i$-port subset of the $N_{TX}$ NP CSI-RS ports. The subset is indicated as a part of the DCI field either jointly encoded or separately encoded with the CSI request field.

A fourth option which is a variation of the second option is also applicable to aperiodic CSI (A-CSI). Here, when a UE receives a CSI request included as a DCI field in an UL grant, a UE reports a series of $M_{SUB}$ A-CSIs where the i-th CSI report is associated with $N_i$-port subset of the $N_{TX}$ NP CSI-RS ports. Therefore, one CSI request triggers a series (multiple shots) of $M_{SUB}$ A-CSI reports. Two consecutive CSI reports can be separated by a few subframes.

In either of these options, an eNB can switch between full- and partial-port NP CSI-RS, or between two different partial-port (subset selection) patterns.

The third component, concurrent use of NP CSI-RS and BF CSI-RS (hybrid CSI-RS), can be described as follows. The combined DL channel information from multiple subsets is then utilized for link adaptation. Furthermore, the combined DL channel information can be used to derive a precoding vector or matrix (a beamformer) for forming BF CSI-RS associated with that UE. That is, a beamformer derived from a reconstructed DL channel is applied on $N_{TX}$-port NP CSI-RS (associated with either 1D or 2D pattern) to form a $M_{P,BF}$-port BF CSI-RS (associated with either 1D or 2D pattern, where $M_{P,BF} \leq N_{TX}$) for that UE.

Upon receiving a subframe containing BF CSI-RS, a UE measures DL channel associated with the $M_{P,BF}$ BF CSI-RS ports. From this channel measurement, the UE derives CSI parameters such as RI and/or CQI computed under a certain hypothesis, along with at least one PMI. This PMI represents a recommended precoding matrix measured from the $M_{P,BF}$ BF CSI-RS ports. Combined with the previously received explicit feedback, this PMI can assist the eNB in determining precoding vector/matrix applied to data transmission performed across $N_{TX}$ antenna ports. These CSI entities are then reported to the eNB. In another example, explicit feedback (quantized DL channel) can also be reported even when the UE measures BF CSI-RS.

The concurrent use of both types of CSI-RS can also be described as follows. When NP CSI-RS is transmitted together with UE-specific BF CSI-RS from an eNB, NP CSI-RS can be transmitted at a lower rate compared to UE-specific BF CSI-RS just as in hybrid CSI-RS scheme. To ensure that a UE knows whether a CSI-RS-bearing subframe contains NP CSI-RS or BF CSI-RS, an indicator can be signaled to the UE, either semi-statically (via higher layer signaling which, for instance, can be a part of CSI-RS resource configuration or CSI process configuration) or dynamically (conveyed via DL control channel). This is performed by configuring a UE with CLASS A ('nonPrecoded') eMIMO-Type and CLASS B ('beamformed') eMIMO-Type corresponding to NP CSI-RS and BF CSI-RS, respectively. These two eMIMO-Type configurations can be done with one CSI process or two CSI processes (each associated with one eMIMO-Type).

At least two embodiments are available for multiplexing NP CSI-RS and BF CSI-RS. A first embodiment entails periodic transmission of both NP CSI-RS and UE-specific BF CSI-RS. In this embodiment, a first BF CSI-RS is transmitted with periodicity T1 (ms) and a second NP CSI-RS is transmitted with periodicity T2 (ms), where T1≤T2. For instance T2 can be made an integer (1, 2, 3, . . . ) multiple of T1. Here, the lower-rate NP CSI-RS is transmitted so that a UE is able to measure non-precoded DL channel and report an indication of DL long-term channel statistics.

Figure 9A:
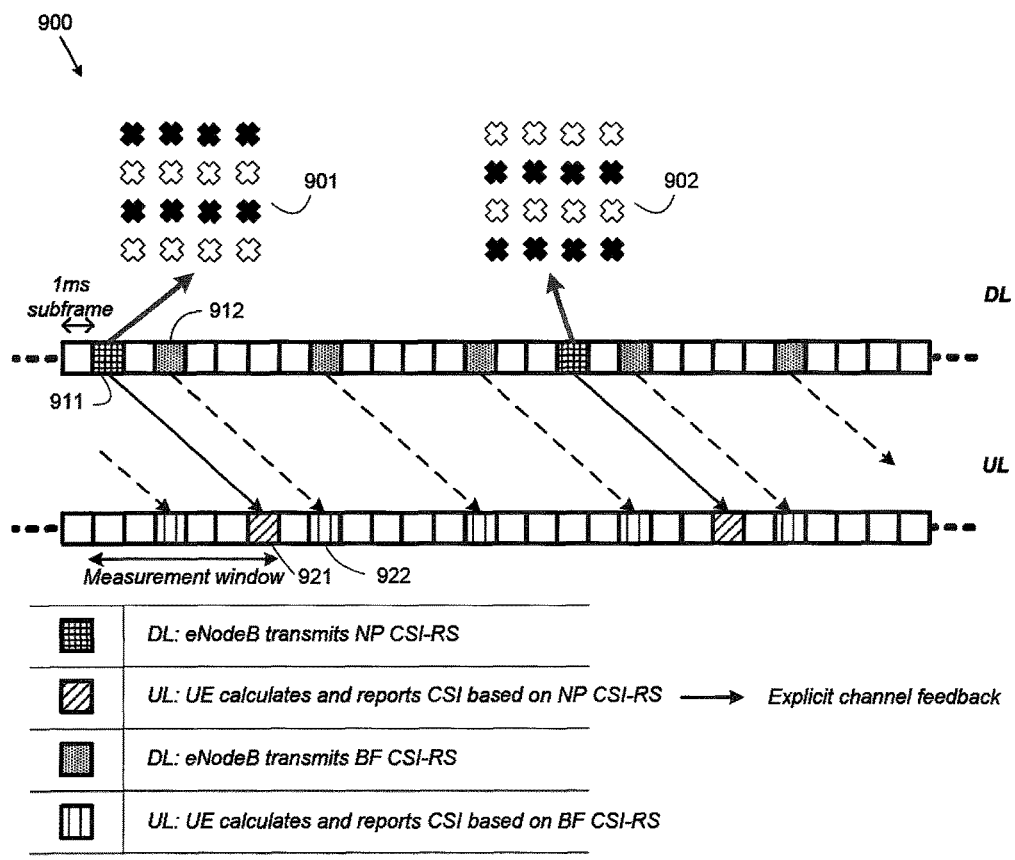
FIG. 9A illustrates an example concurrent or hybrid usage of NP CSI-RS and BF CSI-RS wherein a UE reports an explicit channel feedback in response to measuring periodically-transmitted NP CSI-RS according to an embodiment of the present disclosure.

FIG. 9A illustrates an example concurrent or hybrid usage of NP CSI-RS and BF CSI-RS, together with partial-port CSI-RS mapping, wherein a UE reports an explicit channel feedback for each port subset in response to measuring periodically-transmitted NP CSI-RS according to an embodiment of the present disclosure. The embodiment shown in FIG. 9A is for illustration only. Other embodiments could be used without departing from the scope of the present disclosure.

FIG. 9A illustrates an example implementation of the first embodiment with a total number of NP CSI-RS ports of $N_{TX}$=32 (a rectangular array with 4 rows, 4 columns, and dual-polarized components) and T2=3×T1. A DL-UL timing diagram 900 is used for illustrative purposes. Two subsets of the 2D full-port patterns (901 and 902) which represent subsampling in vertical dimension are used intermittently to transmit NP CSI-RS in subframes 911 (configured to transmit NP CSI-RS). Upon receiving such a subframe from a serving eNB (e.g., eNB 102), a UE (e.g., UE 116) measures a respective DL channel (which corresponds to 16 ports in this example) within an allowable measurement window. Then the UE responds by quantizing the measured DL channel and feeding back the quantization information to the eNB in subframe 921. This explicit channel feedback can be accompanied with other CSI parameters. The eNB can utilize two consecutive explicit feedbacks to reconstruct a full-port estimate of the DL channel. Having received and decoded the feedback associated with a 16-port subset, the eNB utilizes the feedback to perform beamforming on CSI-RS transmitted in subframes 912 (hence the BF CSI-RS). Upon receiving such a subframe from a serving eNB, a UE measures a CSI and responds by feeding back CSI parameters in subframes 922.

The scheme exemplified in FIG. 9A, where partial-port NP CSI-RS is transmitted periodically, can be used in conjunction with either periodic or aperiodic CSI reporting. Regardless whether the UE reports a periodic or an aperiodic CSI, the UE derives and reports CSI depending on the most recent CSI-RS type received and measured by the UE. For example, if the most recent CSI-RS is partial-port non-precoded, the UE reports a quantized channel associated with the $N_P$ ports (which can be accompanied by other CSI parameters). If the most recent CSI-RS is beamformed, the UE reports CSI parameters (such as RI, CQI, and at least one PMI) associated with the $M_{P,BF}$ ports (which can be accompanied by quantized DL channel feedback). Therefore, the UE is responsive to the type of CSI-RS that is most recently received and measured.

A second embodiment entails aperiodic transmission of partial-port NP CSI-RS while UE-specific BF CSI-RS can be transmitted either periodically or aperiodically. In this embodiment, a partial-port NP CSI-RS is transmitted in a subframe containing either an UL grant which requests a UE to report aperiodic CSI or a DL assignment. Transmitting a partial-port NP CSI-RS together with a CSI-triggering UL grant associates the requested aperiodic CSI reporting with the companion partial-port NP CSI-RS.

Figure 9B:
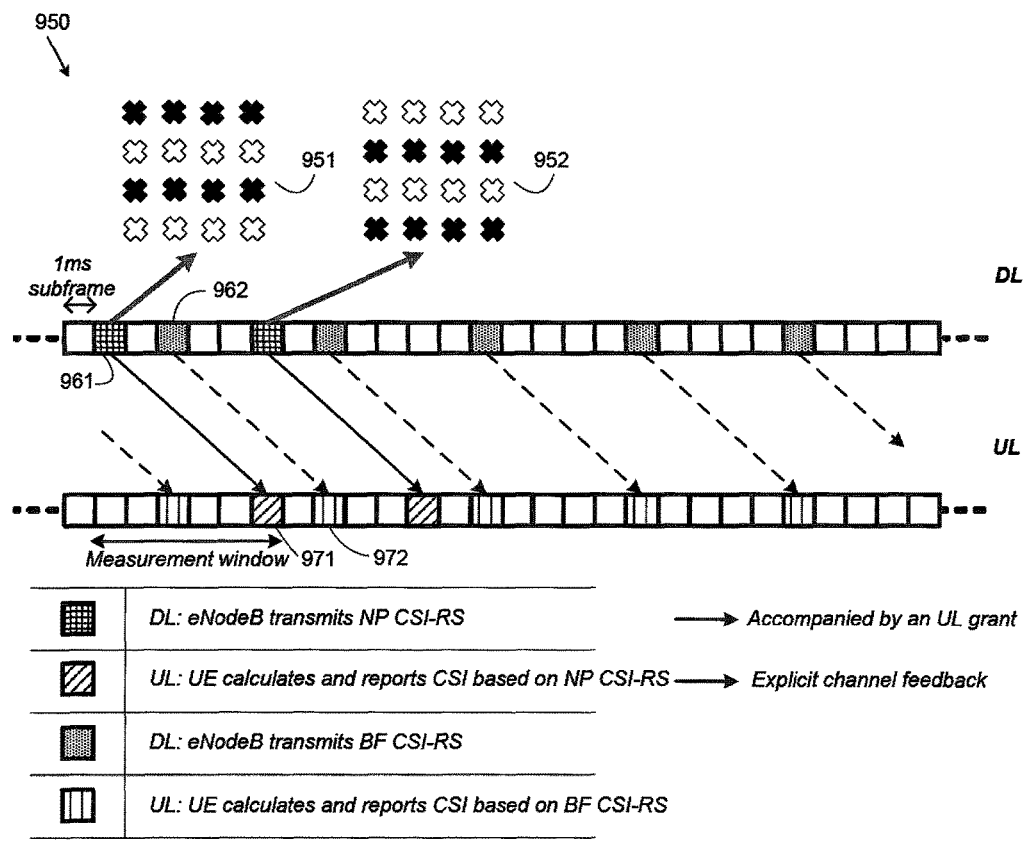
FIG. 9B illustrates an example concurrent or hybrid usage of NP CSI-RS and BF CSI-RS wherein a UE reports an explicit channel feedback in response to measuring aperiodically-transmitted NP CSI-RS according to an embodiment of the present disclosure.

FIG. 9B illustrates an example concurrent or hybrid usage of NP CSI-RS and BF CSI-RS, together with partial-port CSI-RS mapping, wherein a UE reports an explicit channel feedback for each port subset in response to measuring periodically-transmitted NP CSI-RS according to an embodiment of the present disclosure. The embodiment shown in FIG. 9B is for illustration only. Other embodiments could be used without departing from the scope of the present disclosure.

FIG. 9B illustrates an example implementation of the second embodiment with a total number of NP CSI-RS ports of $N_{TX}$=32 (a rectangular array with 4 rows, 4 columns, and dual-polarized components) and T2=3×T1. A DL-UL timing diagram 950 is used for illustrative purposes. Two subsets of the 2D full-port patterns (951 and 952) which represent subsampling in vertical dimension are used intermittently to transmit NP CSI-RS in subframes 961 (configured to transmit NP CSI-RS). In this example, transmission of partial-port NP CSI-RS is accompanied by an UL grant which triggers an aperiodic CSI reporting from the UE (e.g., UE 116). Upon receiving such a subframe from a serving eNB (e.g., eNB 102), a UE measures a respective DL channel (which corresponds to 16 ports in this example) within an allowable measurement window. Then the UE responds by quantizing the measured DL channel and feeding the quantization information back to the eNB in subframe 971. This explicit channel feedback can be accompanied with other CSI parameters. The eNB can utilize two consecutive explicit feedbacks to reconstruct a full-port estimate of the DL channel. Having received and decoded the feedback associated with a 16-port subset, the eNB utilizes the feedback to perform beamforming on CSI-RS transmitted in subframes 962 (hence the BF CSI-RS). Upon receiving such a subframe from a serving eNB, a UE measures a CSI and responds by feeding back CSI parameters in subframes 972.

In this example scheme, associating partial-port NP CSI-RS transmission with aperiodic CSI triggering facilitates an efficient "on-demand" operation where the eNB transmits a NP CSI-RS and configures a UE for measuring the NP CSI-RS only when necessary. Its operation is therefore left for eNB implementation.

The manner in which NP CSI-RS and BF CSI-RS are multiplexed for a given UE is largely determined by CSI process and CSI-RS resource configurations. At least three options exist. In a first option, a serving eNB configures two CSI processes for a UE, one for NP CSI-RS or a class A (nonPrecoded) eMIMO-Type, another for BF CSI-RS or a class B (beamformed) eMIMO-Type. Alternatively, instead of using a class A (nonPrecoded) eMIMO-Type, a class B (beamformed) eMIMO-Type composed of two 8-port NZP CSI-RS resources can be used. For each of the two CSI processes, a single NZP (non-zero-power) CSI-RS resource is configured. In a second option, a serving eNB configures only one CSI processes for a UE. This single CSI process is utilized for both NP CSI-RS and BF CSI-RS. But within this single CSI process, two NZP CSI-RS resources are assigned, one for NP CSI-RS, another for BF CSI-RS. In a third option, a serving eNB configures only one CSI processes for a UE. This single CSI process is utilized for both NP CSI-RS and BF CSI-RS. Furthermore, only one NZP CSI-RS resource is used for both NP CSI-RS and BF CSI-RS.

From FIG. 9A or 9B, a joint usage of the first component (partial-port CSI-RS mapping) and the second component (explicit channel feedback) can be inferred by one skilled in the art and is covered in the present disclosure. An example of explicit channel feedback scheme for this joint usage is described as follows. For an i-th $N_i$-port subset of the $N_{TX}$-port NP CSI-RS (for instance, associated with one NZP CSI-RS resource), the serving eNB configures a UE to report a CSI which at least includes an explicit channel feedback derived from a measurement of the NZP CSI-RS resource associated with the subset of the $N_{TX}$-port NP CSI-RS. An explicit feedback can entail direct DL channel quantization rather than a recommended precoder of the implicit feedback. Direct DL channel quantization includes quantization of the DL channel (where the number of coefficients/parameters is the number of CSI-RS ports per subset multiplied with the number of receive antenna ports at the UE) obtained from measurement, quantization of at least one eigenvector of the DL channel (where the number of coefficients/parameters is the number of CSI-RS ports per subset for each eigenvector), or quantization of a DL channel covariance matrix (where the number of coefficients/parameters is proportional to the quadratic of the number of CSI-RS ports per subset). The first two channel entities relate to DL short-term channel properties while the third channel entity is a DL long-term channel statistics.

From FIG. 9A or 9B, a joint usage of the second component (explicit channel feedback) and the third component (hybrid CSI-RS) can be inferred by one skilled in the art and is covered in the present disclosure. An example of explicit channel feedback scheme for this joint usage is described as follows. For the $N_{TX}$-port NP CSI-RS (for instance, associated with one NZP CSI-RS resource), the serving eNB configures a UE to report a CSI which at least includes an explicit channel feedback derived from a measurement of the NZP CSI-RS resource associated with the $N_{TX}$-port NP CSI-RS. An explicit feedback can entail direct DL channel quantization rather than a recommended precoder of the implicit feedback. Direct DL channel quantization includes quantization of the DL channel (where the number of coefficients/parameters is the number of CSI-RS ports $N_{TX}$ multiplied with the number of receive antenna ports at the UE) obtained from measurement, quantization of at least one eigenvector of the DL channel (where the number of coefficients/parameters is the number of CSI-RS ports $N_{TX}$ for each eigenvector), or quantization of a DL channel covariance matrix (where the number of coefficients/parameters is proportional to the quadratic of the number of CSI-RS ports). The first two channel entities relate to DL short-term channel properties while the third channel entity is a DL long-term channel statistics.

To further reduce overhead associated with NP CSI-RS, in another embodiment frequency domain subsampling can be used in conjunction with partial-port (port-domain subsampling). This is applicable when NP CSI-RS is used to measure DL long-term and/or wideband channel statistics at a UE. Therefore, frequency-domain granularity for NP CSI-RS can be reduced. At least two schemes fall into this category.

A first scheme entails an eNB transmitting NP CSI-RS using a reduced number of resource elements (REs) per NP CSI-RS port per subframe across the entire system bandwidth or frequency allocation. The number of REs used for transmitting NP CSI-RS can be between one and N where N is the maximum allowable number of REs per antenna port. This number can be fixed (predetermined) or configured by the eNB via higher-layer signaling. In the second case, the eNB chooses the number of REs (or frequency-domain granularity of NP CSI-RS) from a finite set of possible values, ranging from 1 to N. This configuration can be cell-specific or UE-specific.

A second scheme entails an eNB transmitting NP CSI-RS on different subsets of REs across different RBs or different groups of RBs. The pattern for subset variation or cycling across different RBs or different groups of RBs can be predetermined or configured by the eNB. This subset variation or cycling pattern can be signaled to a UE. By doing so, the eNB enables a UE to perform frequency-domain interpolation for CSI measurement. In another example, the eNB can perform such frequency interpolation itself as the eNB receives explicit channel feedback across multiple subframes from the UE.

Figure 10:
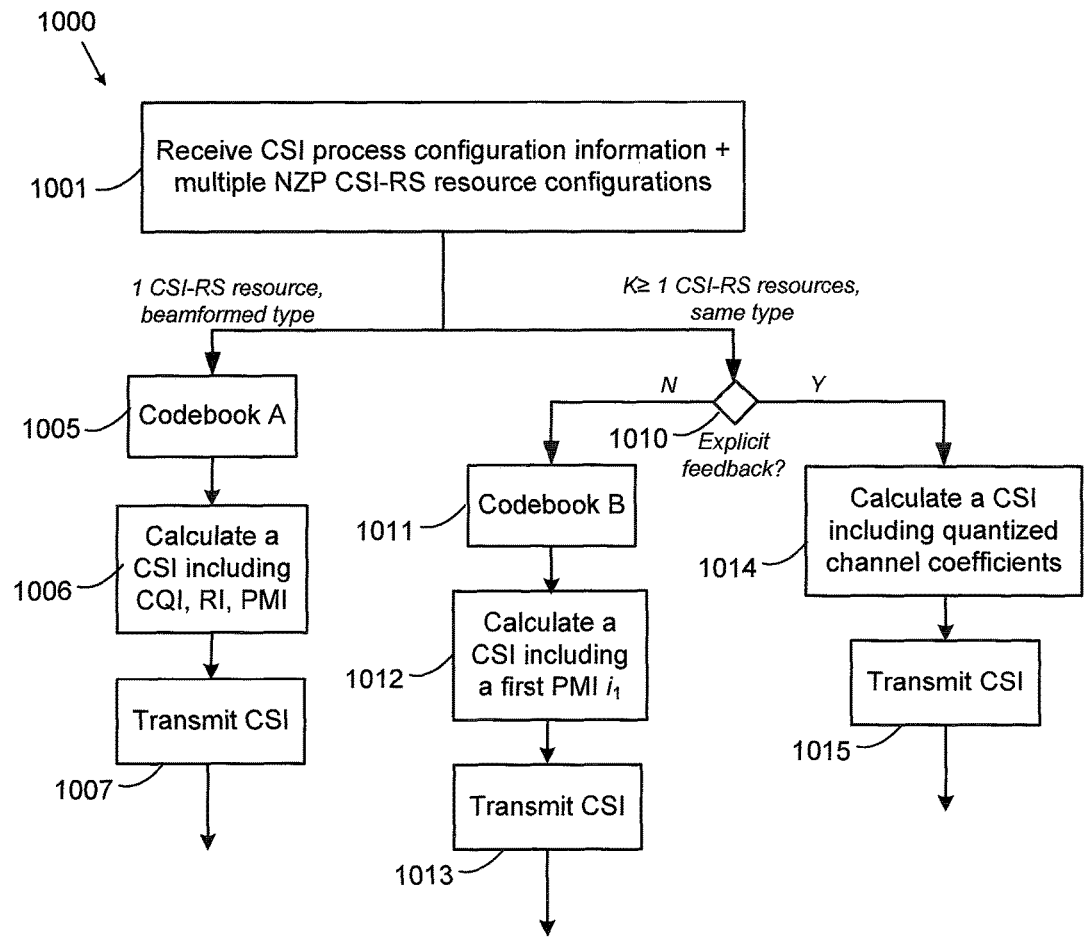
FIG. 10 illustrates an example method wherein a UE receives CSI process configuration information and a plurality of NZP CSI-RS resource configurations according to an embodiment of the present disclosure.

FIG. 10 illustrates an example method 1000 wherein a UE receives CSI process configuration information and a plurality of NZP CSI-RS resource configurations according to an embodiment of the present disclosure. For example, the method 1000 can be performed by the UE 116.

The method begins with the UE receiving CSI process configuration information and a plurality of NZP CSI-RS resource configurations in step 1001. At least one of the CSI-RS resources is associated with a CSI-RS type or a MIMO type of 'beamformed'/CLASS B. For this CSI-RS resource, a codebook A (step 1005) is used to calculate a CSI (step 1006) which includes a CQI, a RI, and a PMI derived from the codebook A. Then the UE transmits the CSI (step 1007). At least K≥1 other CSI-RS resources are configured with a same CSI-RS type or a MIMO type (either 'beamformed'/CLASS B or 'non-precoded'/CLASS A). For these K CSI-RS resources, the UE is configured to report a CSI including either a type of explicit feedback (such as a set of quantized channel coefficients) or the type similar to the first CSI-RS resource and determines the configuration in step 1010. This configuration can be performed semi-statically via higher-layer signaling or dynamically via a DL control channel. That is, the UE receives either an RRC parameter or a DCI field indicating whether the UE reports a CSI including explicit feedback or not. If the UE is not configured to report a CSI with explicit feedback based on these K CSI-RS resources, a codebook B different from codebook A is identified (step 1011) to be used to calculate a CSI which includes a first PMI $i_1$ (step 1012). This first PMI can include one codebook index or two codebook indices ($i_{1,1}$, $i_{1,2}$) depending on codebook configuration. Then the UE transmits the CSI (step 1013). If the UE is configured to report a CSI with explicit feedback based on these K CSI-RS resources in step 1010, the UE calculates a CSI which includes a set of quantized channel coefficients (step 1014). Then the UE transmits the CSI (step 1015).

Figure 11:
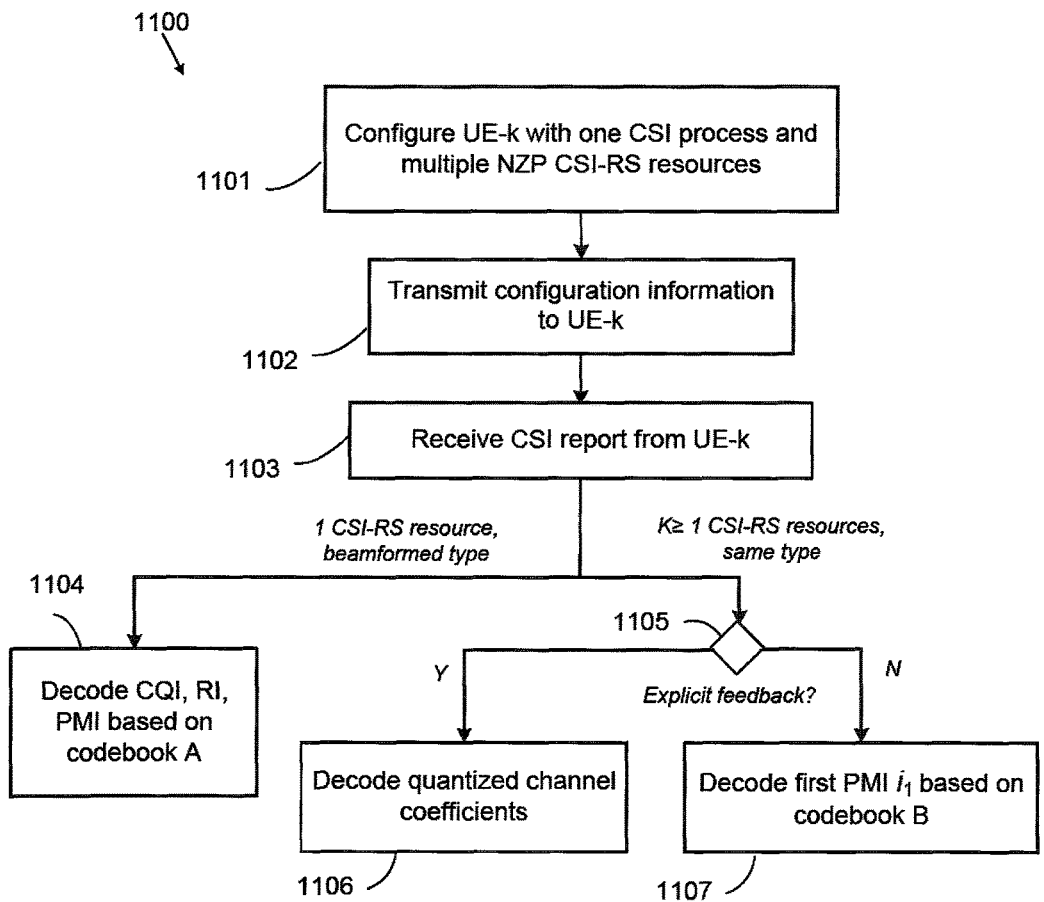
FIG. 11 illustrates an example method wherein an eNB configures a UE (labeled as UE-k) with one CSI process and a plurality of NZP CSI-RS resource configurations according to an embodiment of the present disclosure.

FIG. 11 illustrates an example method 1100 wherein an eNB configures a UE (labeled as UE-k) with one CSI process and a plurality of NZP CSI-RS resource configurations according to an embodiment of the present disclosure. For example, the method 1000 can be performed by the eNB 102.

The method 1100 begins with the eNB configuring a UE (labeled as UE-k) with one CSI process and a plurality of NZP CSI-RS resource configurations (in step 1101). For example, in step 1101, the eNB can generate configuration information indicating the CSI process and NZP CSI-RS resource configurations of the UE. The eNB transmits the configuration information to UE-k via higher-layer (RRC) signaling (step 1102). In turn, the eNB receives a CSI report from UE-k (step 1103) and decodes the content in accordance with the configuration information for UE-k (steps 1104, 1106, or 1107). For one of the CSI-RS resources associated with a CSI-RS type or a MIMO type of 'beamformed'/CLASS B, a CQI, a RI, and a PMI are decoded from the CSI report based one a codebook A (step 1104). For K≥1 other CSI-RS resources configured with a same CSI-RS type or a MIMO type (either 'beamformed'/CLASS B or 'non-precoded'/CLASS A), the eNB decodes either a plurality of quantized channel coefficients (step 1106) or a first PMI $i_1$ based on a codebook B different from codebook A (step 1107), depending on a CSI content configuration parameter for UE-k. This first PMI can include one codebook index or two codebook indices ($i_{1,1}$, $i_{1,2}$) depending on codebook configuration as identified by the eNB in step 1105. This configuration can be performed semi-statically via higher-layer signaling or dynamically via a DL control channel. That is, the UE receives either an RRC parameter or a DCI field indicating whether the UE reports a CSI including explicit feedback (such as a plurality of quantized channel coefficients) or not.

In either case (1106 or 1107) (i.e., either result of the identification in step 1105), the eNB can jointly utilize K (>1) CSI reports associated with the K CSI-RS resources (of the same CSI-RS or MIMO type). This can be done, for example, to facilitate transmissions with a large number of antenna ports. For instance, the K (>1) CSI-RS resources can correspond to some K subsets of a larger $N_{TX}$-port CSI-RS setup thereby implementing a partial-port CSI-RS mapping. Therefore, when the UE is configured to report CSI including quantized channel coefficients, the eNB can combine the K sets of quantized channels to estimate the channel associated with $N_{TX}$ CSI-RS ports.

Although FIGS. 10 and 11 illustrate examples of processes for receiving configuration information and configuring a UE, respectively, various changes could be made to FIGS. 10 and 11. For example, while shown as a series of steps, various steps in each figure could overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims.

What is claimed:

1. A user equipment (UE) comprising:
a transceiver configured to receive channel state information (CSI) process configuration information with a plurality of non-zero-power (NZP) CSI reference signal (CSI-RS) resource configurations, wherein at least one of the NZP CSI-RS resource configurations corresponds to a beamformed type and at least another of the NZP CSI-RS resource configurations corresponds to a non-precoded type; and
a processor operably connected to the transceiver, the processor configured to calculate, in response to receipt of the configuration information, a first CSI report associated with the beamformed type using a first codebook associated with the beamformed type and to calculate a second CSI report associated with the non-precoded type using a second codebook different from the first codebook,
wherein the transceiver is further configured to transmit the first and second CSI reports on one or more uplink channels.

2. The UE of claim 1, wherein the first CSI report includes a channel quality indicator (CQI), a rank indicator (RI), and a precoding matrix indicator (PMI) derived from the first codebook.

3. The UE of claim 2, wherein the second CSI report associated with the non-precoded type includes a first PMI including one or two indices derived from the second codebook different from the first codebook associated with the beamformed type.

4. The UE of claim 3, wherein the second CSI report associated with the non-precoded type further includes a recommended number of ports for the beamformed type.

5. The UE of claim 1, wherein:
the plurality of NZP CSI-RS resource configurations includes the at least one NZP CSI-RS resource configuration and one or more other NZP CSI-RS resource configurations, and
each of the one or more other NZP CSI-RS resource configurations is associated with a CSI report that includes a plurality of quantized channel coefficients measured from a corresponding CSI-RS resource.

6. The UE of claim 5, wherein the one or more other NZP CSI-RS resource configurations is associated with a non-precoded type.

7. The UE of claim 5, wherein the one or more other NZP CSI-RS resource configurations is associated with the beamformed type.

8. A base station (BS) comprising:
a processor configured to generate configuration information to configure a user equipment (UE) with a channel state information (CSI) process and configure the UE with a plurality of non-zero-power (NZP) CSI reference signal (CSI-RS) resource configurations, wherein at least one of the NZP CSI-RS resource configurations corresponds to a beamformed type and at least another of the NZP CSI-RS resource configurations corresponds to a non-precoded type; and
a transceiver operably connected to the processor, the transceiver configured to:
transmit the configuration information for the CSI process and the NZP CSI-RS resources; and
receive, in accordance with the configuration information, a first CSI report associated with the beamformed type calculated based on a first codebook associated with the beamformed type and a second CSI report associated with the non-precoded type using a second codebook different from the first codebook.

9. The BS of claim 8, wherein the first CSI report includes a channel quality indicator (CQI), a rank indicator (RI), and a precoding matrix indicator (PMI) derived from the first codebook.

10. The BS of claim 9, wherein the second CSI report associated with the non-precoded type includes a first PMI including one or two indices derived from the second codebook different from the first codebook associated with the beamformed type.

11. The BS of claim 10, wherein the second CSI report associated with the non-precoded type further includes a recommended number of ports for the beamformed type.

12. The BS of claim 8, wherein:
the plurality of NZP CSI-RS resource configurations includes the at least one NZP CSI-RS resource configuration and one or more other NZP CSI-RS resource configurations, and
each of the one or more other NZP CSI-RS resource configurations is associated with a CSI report that includes a plurality of quantized channel coefficients measured from a corresponding CSI-RS resource.

13. The BS of claim 12, wherein the one or more other NZP CSI-RS resource configurations is associated with the beamformed type.

14. A method for operating a user equipment (UE), the method comprising:
receiving, by the UE, channel state information (CSI) process configuration information with a plurality of non-zero-power (NZP) CSI reference signal (CSI-RS) resource configurations, wherein at least one of the NZP CSI-RS resource configurations corresponds to a beamformed type and at least another of the NZP CSI-RS resource configurations corresponds to a non-precoded type;
in response to receipt of the configuration information, calculating, by the UE, a first CSI report associated with the beamformed type using a first codebook associated with the beamformed type and calculating a second CSI report associated with the non-precoded type using a second codebook different from the first codebook; and
transmitting, by the UE, the first and second CSI reports on one or more uplink channels.

15. The method of claim 14, wherein the first CSI report includes a channel quality indicator (CQI), a rank indicator (RI), and a precoding matrix indicator (PMI) derived from the first codebook.

16. The method of claim 15, wherein the second CSI report associated with the non-precoded type includes a first PMI including one or two indices derived from the second codebook different from the first codebook associated with the beamformed type.

17. The method of claim 16, wherein the second CSI report associated with the non-precoded type further includes a recommended number of ports for the beamformed type.

18. The method of claim 14, wherein:
the plurality of NZP CSI-RS resource configurations includes the at least one NZP CSI-RS resource configuration and one or more other NZP CSI-RS resource configurations, and
each of the one or more other NZP CSI-RS resource configurations is associated with a CSI report that includes a plurality of quantized channel coefficients measured from a corresponding CSI-RS resource.

19. The method of claim 18, wherein the one or more other NZP CSI-RS resource configurations is associated with a non-precoded type.

20. The method of claim 18, wherein the one or more other NZP CSI-RS resource configurations is associated with the beamformed type.

* * * * *